US010277645B2

(12) United States Patent
Rosenberg

(10) Patent No.: US 10,277,645 B2
(45) Date of Patent: Apr. 30, 2019

(54) SUGGESTION AND BACKGROUND MODES FOR REAL-TIME COLLABORATIVE INTELLIGENCE SYSTEMS

(71) Applicant: Unanimous A.I., Inc., San Francisco, CA (US)

(72) Inventor: Louis B. Rosenberg, San Luis Obispo, CA (US)

(73) Assignee: Unanimous A. I., Inc., San Francisco, CA (US)

( * ) Notice: Subject to any disclaimer, the term of this patent is extended or adjusted under 35 U.S.C. 154(b) by 673 days.

(21) Appl. No.: 14/920,819

(22) Filed: Oct. 22, 2015

(65) Prior Publication Data
US 2016/0044073 A1    Feb. 11, 2016

Related U.S. Application Data

(63) Continuation-in-part of application No. 14/668,970, filed on Mar. 25, 2015, now Pat. No. 9,959,028, and
(Continued)

(51) Int. Cl.
*H04L 29/06* (2006.01)
*H04L 12/58* (2006.01)
(Continued)

(52) U.S. Cl.
CPC ........ *H04L 65/4038* (2013.01); *E21B 47/122* (2013.01); *E21B 47/18* (2013.01);
(Continued)

(58) Field of Classification Search
CPC ............. G06F 3/0482; G06F 17/30654; H04L 65/4038
See application file for complete search history.

(56) References Cited

U.S. PATENT DOCUMENTS 5,236,199 A    8/1993  Thompson, Jr.
5,400,248 A    3/1995  Chisholm
(Continued)

FOREIGN PATENT DOCUMENTS

CA        2414397       8/2003
JP        2010191533    9/2010
(Continued)

OTHER PUBLICATIONS

PCT; International Search Report and Written Opinion of the International Searching Authority for PCT/US2016/040600 dated Nov. 29, 2016.
(Continued)

*Primary Examiner* — Daeho D Song
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of computing devices. Collaborative sessions are run wherein a group of independent users, networked over the internet, collaboratively answer questions in real-time, thereby harnessing their collective intelligence. Systems and methods for suggestion modes wherein group users select one suggestion from a plurality of suggestions are disclosed, including systems and methods for multi-phase, multi-group suggestion mode embodiments. Methods for background swarming modes and reactivation of the group are also disclosed.

11 Claims, 17 Drawing Sheets

Related U.S. Application Data a continuation-in-part of application No. 14/708,038, filed on May 8, 2015, and a continuation-in-part of application No. 14/738,768, filed on Jun. 12, 2015, now Pat. No. 9,940,006, and a continuation-in-part of application No. 14/859,035, filed on Sep. 18, 2015, now Pat. No. 10,122,775.

(60) Provisional application No. 62/067,505, filed on Oct. 23, 2014, provisional application No. 61/970,885, filed on Mar. 26, 2014, provisional application No. 61/991,505, filed on May 10, 2014, provisional application No. 62/012,403, filed on Jun. 15, 2014, provisional application No. 62/066,718, filed on Oct. 21, 2014.

(51) Int. Cl.

| | | |
|---|---|---|
| *G06F 17/30* | (2006.01) | |
| *G06F 3/0482* | (2013.01) | |
| *E21B 47/12* | (2012.01) | |
| *E21B 47/18* | (2012.01) | |
| *G06F 3/0484* | (2013.01) | |
| *H04L 29/08* | (2006.01) | |

(52) U.S. Cl.
CPC .... *G06F 3/04847* (2013.01); *G06F 17/30654* (2013.01); *H04L 51/046* (2013.01); *H04L 67/10* (2013.01); *H04L 67/1044* (2013.01); *H04L 67/14* (2013.01); *H04L 67/22* (2013.01)

(56) References Cited

U.S. PATENT DOCUMENTS

| | | | |
|---|---|---|---|
| 5,808,908 | A | 9/1998 | Ghahramani |
| 6,064,978 | A | 5/2000 | Gardner |
| 6,480,210 | B1 | 11/2002 | Martino |
| 7,031,842 | B1 | 4/2006 | Musat |
| 7,158,112 | B2 | 1/2007 | Rosenberg |
| 7,489,979 | B2 | 2/2009 | Rosenberg |
| 7,542,816 | B2 | 6/2009 | Rosenberg |
| 7,562,117 | B2 | 7/2009 | Rosenberg |
| 7,603,414 | B2 | 10/2009 | Rosenberg |
| 7,831,928 | B1 | 11/2010 | Rose |
| 7,917,148 | B2 | 3/2011 | Rosenberg |
| 7,937,285 | B2 | 5/2011 | Goldberg |
| 8,176,101 | B2 | 5/2012 | Rosenberg |
| 8,589,488 | B2 | 11/2013 | Huston |
| 8,745,104 | B1 | 6/2014 | Rosenberg |
| 8,762,435 | B1 | 6/2014 | Rosenberg |
| 9,483,161 | B2 * | 11/2016 | Wenger ................. G06F 3/0482 |
| 2002/0042920 | A1 | 4/2002 | Thomas |
| 2002/0171690 | A1 | 11/2002 | Fox |
| 2003/0065604 | A1 | 4/2003 | Gatto |
| 2003/0079218 | A1 | 4/2003 | Goldberg |
| 2004/0210550 | A1 | 10/2004 | Williams |
| 2005/0067493 | A1 | 3/2005 | Urken |
| 2005/0168489 | A1 | 8/2005 | Ausbeck |
| 2005/0218601 | A1 | 10/2005 | Capellan |
| 2005/0261953 | A1 | 11/2005 | Malek |
| 2006/0147890 | A1 | 7/2006 | Bradford |
| 2006/0200401 | A1 | 9/2006 | Lisani |
| 2006/0250357 | A1 | 11/2006 | Safai |
| 2007/0039031 | A1 | 2/2007 | Cansler, Jr. |
| 2007/0097150 | A1 | 5/2007 | Ivashin |
| 2007/0099162 | A1 | 5/2007 | Sekhar |
| 2007/0124503 | A1 | 5/2007 | Ramos |
| 2007/0211050 | A1 | 9/2007 | Ohta |
| 2007/0220100 | A1 | 9/2007 | Rosenberg |
| 2008/0091777 | A1 * | 4/2008 | Carlos ................... G06Q 10/10 709/204 |
| 2008/0103877 | A1 | 5/2008 | Gerken |
| 2009/0037355 | A1 | 2/2009 | Brave |
| 2009/0063379 | A1 | 3/2009 | Kelly |
| 2009/0063463 | A1 | 3/2009 | Turner |
| 2009/0063991 | A1 | 3/2009 | Baron |
| 2009/0063995 | A1 | 3/2009 | Baron |
| 2009/0239205 | A1 | 9/2009 | Morgia |
| 2009/0254836 | A1 | 10/2009 | Bajrach |
| 2009/0287685 | A1 | 11/2009 | Charnock |
| 2009/0325533 | A1 | 12/2009 | Lele |
| 2010/0145715 | A1 | 6/2010 | Cohen |
| 2010/0169144 | A1 | 7/2010 | Estill |
| 2010/0174579 | A1 | 7/2010 | Hughes |
| 2010/0299616 | A1 | 11/2010 | Chen |
| 2011/0016137 | A1 * | 1/2011 | Goroshevsky ......... G06Q 30/02 707/758 |
| 2011/0080341 | A1 | 4/2011 | Helmes |
| 2011/0087687 | A1 | 4/2011 | Immaneni |
| 2011/0119048 | A1 | 5/2011 | Shaw |
| 2011/0141027 | A1 | 6/2011 | Ghassabian |
| 2011/0166916 | A1 | 7/2011 | Inbar |
| 2012/0005131 | A1 | 1/2012 | Horvitz |
| 2012/0011006 | A1 | 1/2012 | Schultz |
| 2012/0013489 | A1 | 1/2012 | Earl |
| 2012/0072843 | A1 * | 3/2012 | Durham .................. G06F 3/041 715/733 |
| 2012/0079396 | A1 | 3/2012 | Neer |
| 2012/0109883 | A1 | 5/2012 | Iordanov |
| 2012/0191774 | A1 | 7/2012 | Bhaskaran |
| 2012/0290950 | A1 | 11/2012 | Rapaport |
| 2013/0013248 | A1 | 1/2013 | Brugler |
| 2013/0041720 | A1 | 2/2013 | Spires |
| 2013/0097245 | A1 | 4/2013 | Adarraga |
| 2013/0160142 | A1 | 6/2013 | Lai |
| 2013/0171594 | A1 | 7/2013 | Gorman |
| 2013/0231595 | A1 | 9/2013 | Zoss |
| 2013/0298690 | A1 | 11/2013 | Bond |
| 2013/0311904 | A1 | 11/2013 | Tien |
| 2013/0339445 | A1 | 12/2013 | Perincherry |
| 2014/0057240 | A1 * | 2/2014 | Colby ...................... G09B 7/02 434/350 |
| 2014/0100924 | A1 | 4/2014 | Ingenito |
| 2014/0108915 | A1 | 4/2014 | Lu |
| 2014/0128162 | A1 | 5/2014 | Arafat |
| 2014/0129946 | A1 | 5/2014 | Harris |
| 2014/0162241 | A1 | 6/2014 | Morgia |
| 2014/0249889 | A1 | 9/2014 | Park |
| 2014/0258970 | A1 | 9/2014 | Brown |
| 2014/0279625 | A1 | 9/2014 | Carter |
| 2014/0337097 | A1 | 11/2014 | Farlie |
| 2014/0358825 | A1 | 12/2014 | Phillipps |
| 2014/0379439 | A1 | 12/2014 | Sekhar |
| 2015/0089399 | A1 | 3/2015 | Megill |
| 2015/0149932 | A1 * | 5/2015 | Yamada .................. G06Q 30/02 715/753 |
| 2015/0156233 | A1 | 6/2015 | Bergo |
| 2015/0170050 | A1 | 6/2015 | Price |
| 2015/0236866 | A1 * | 8/2015 | Colby ...................... G09B 7/02 709/205 |
| 2015/0302308 | A1 | 10/2015 | Bartek |
| 2015/0331601 | A1 | 11/2015 | Rosenberg |
| 2015/0347903 | A1 | 12/2015 | Saxena |
| 2016/0078458 | A1 | 3/2016 | Gold |
| 2016/0170616 | A1 | 6/2016 | Rosenberg |
| 2016/0210602 | A1 | 7/2016 | Siddique |
| 2016/0366200 | A1 | 12/2016 | Healy |
| 2017/0223411 | A1 | 8/2017 | De Juan |

FOREIGN PATENT DOCUMENTS

| | | |
|---|---|---|
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |

OTHER PUBLICATIONS

"Dialogr—A simple tool for collective thinking"; Mar. 25, 2015; http://www.dialogr.com./; 1 page.

(56) References Cited

OTHER PUBLICATIONS

Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room"; Outland Pictures; Amazon; Mar. 30, 2014; 110 pages.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/925,837, filed Oct. 28, 2015.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.

PCT; International Search Report and Written Opinion of the International Searching Authority for PCT/US2017/040480 dated Oct. 23, 2017.
EP; Extended European Search Report for EP Application No. 15852495.9 mailed from the European Patent Office dated Mar. 21, 2018.
Rosenberg; U.S. Appl. No. 15/922,453, filed Mar. 15, 2018.
Rosenberg; U.S. Appl. No. 15/936,324, filed Mar. 26, 2018.
USPTO; Non-Final Office Action for U.S. Appl. No. 14/925,837, dated Apr. 3, 2018.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms, a real-time method for collective intelligence"; Proceedings of the European Conference on Artificial Life; Jul. 2015; pp. 658-659.
USPTO; Non-Final Office Action for U.S. Appl. No. 16/668,970 dated Aug. 15, 2017.
Yeung et al.; "Metacognition in human decision-making: confidence and error monitoring"; Philosophical Transactions of the Royal Society B; 2012; pp. 1310-1321.
Beni; "From Swarm Intelligence to Swarm Robotics"; Swarm Robotics WS 2004, LNCS 3342; pp. 1-9; 2005.
Rosenberg; U.S. Appl. No. 15/199,990, filed Jul. 1, 2016.
Rosenberg; U.S. Appl. No. 15/241,340, filed Aug. 19, 2016.
Salminen; "Collective Intelligence in Humans: A Literature Review"; Lappeenranta University of Technology, Lahti School of Innovation; 1Proceedings; 2012; 8 pages.
Unanimous A. I.; "What is Swarm Intelligence"; 2015; http://unu.ai/swarm-intelligence/; downloaded Oct. 6, 2016; 3 pages.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
USPTO; Non-Final Office Action for U.S. Appl. No. 14/738,768 dated Sep. 8, 2017.
EP; Extended European Search Report for EP Application No. 15767909.3 mailed from the European Patent Office dated Sep. 4, 2017.
USPTO; Notice of Allowance for U.S. Appl. No. 14/738,768 dated Feb. 2, 2018.
USPTO; Non-Final Office Action for U.S. Appl. No. 15/086,034 dated Feb. 2, 2018.
USPTO; Notice of Allowance for U.S. Appl. No. 14/668,970 dated Feb. 8, 2018.
USPTO; Non-Final Office Action for U.S. Appl. No. 14/859,035 dated Feb. 12, 2018.
USPTO; Non-Final Office Action for U.S. Appl. No. 14/708,038 dated Feb. 15, 2018.
USPTO; Non-Final Office Action for U.S. Appl. No. 15/052,876 dated Feb. 22, 2018.
Ding et al; "Time Weight Collaborative Filtering"; CIKM'05, Oct. 31-Nov. 5, 2005; Bremen, Germany; pp. 485-492.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
PCT; International Search Report and Written Opinion of the International Searching Authority for PCT/US2017/062095 dated May 23, 2018.
EP; Extended European Search Report for EP Application No. 15808982.1 mailed from the European Patent Office dated Nov. 28, 2017.
USPTO; Non-Final Office Action for U.S. Appl. No. 15/047,522 dated Jan. 5, 2018.
PCT; International Search Report and Written Opinion of the International Searching Authority for PCT/US2015/56394 dated Feb. 4, 2016.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg: U.S. Appl. No. 15/959,080, filed Apr. 20, 2018.

(56) References Cited

OTHER PUBLICATIONS

USPTO; Final Office Action for U.S. Appl. No. 15/086,034 dated Jul. 17, 2018.
USPTO; Non-Final Office Action for U.S. Appl. No. 15/241,340 dated Jul. 19, 2018.

\* cited by examiner

SUGGESTION AND BACKGROUND MODES FOR REAL-TIME COLLABORATIVE INTELLIGENCE SYSTEMS This application claims the benefit of U.S. Provisional Application No. 62/067,505 entitled SYSTEMS AND METHODS FOR MODERATING REAL-TIME COLLABORATIVE DECISIONS OVER A DISTRIBUTED NETWORKS, filed Oct. 23, 2014, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHOD AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turns claims the benefit of U.S. Provisional Application 62/012,403 entitled AN INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation of International Application No. PCT/US15/56394, filed Oct. 20, 2015.

BACKGROUND OF THE INVENTION

1. Field of the Invention

The present invention relates generally to systems and methods for collaborative intelligence, and more specifically to systems and methods for closed-loop, dynamic collaborative intelligence.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a suggestion mode process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: receiving, from a first computing device of a first user of the group, a representation of a question, an identity of the first user, and a suggestion mode indication; sending of the representation of the question and the suggestion mode indication to each of the plurality of computing devices, whereby each collaboration application updates the display interface to display the representation of the question, the suggestion mode indication and a suggestion input field configured to receive input; receiving, from a second computing device of the group associated with a second user, a representation of a suggestion based on input received by the suggestion input field, and an identity of the second user; adding the representation of the suggestion to a suggestion list; and sending of the representation of the suggestion to the plurality of computing devices.

In another embodiment, the invention can be characterized as a background mode process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: repeatedly determining, while the collaboration applications are running in an active mode, if the background mode process has been triggered by real-time group activity; upon determining that the background mode has been triggered, sending a background mode indication to each of the plurality of computing devices, whereby, the collaboration application of each of the computing devices enters a background mode; repeatedly determining if a wake-up process has been triggered by real-time group activity; and upon determining that the wake-up process has been triggered, sending a wake-up indication to each of the plurality of computing devices, whereby the collaboration application of each of the computing devices returns to the active mode.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
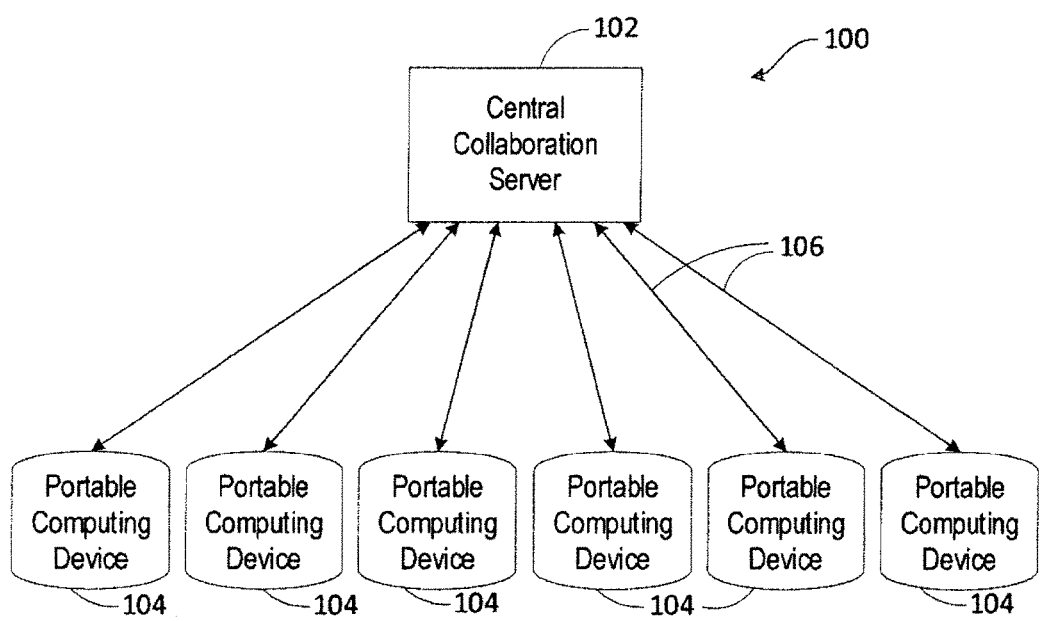
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

As described in related patent application Ser. Nos. 14/668,970, 14/708,038, 14/473,768, and 14/859,035, the massive connectivity provided by the Internet is used to create a real-time closed-loop collaborative consciousness (or emergent group-wise intelligence) by collecting real-time input from large numbers of people through a novel user interface and processing the collected input from that large number of users into a singular group intent that can collectively answer questions, make statements, take actions, select functions, or otherwise respond to prompts in real time.

The methods use intervening software and hardware to moderate the process, closing the loop around the disparate input from each of the many individual participants and the singular output of the group.

A collaboration system has been developed that allows the group of users to collaboratively control a graphical pointer 210 in order to collaboratively answer questions or otherwise respond to prompts. In one embodiment, each individual user ("participant") engages the user interface on a computing device 104, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees the graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device 104 at substantially the same time. While the embodiments described generally refer to portable computing devices, it will be understood that non-portable computing devices, such as desktop computers, may also be used.

Using the disclosed systems and methods, a "social swarming" platform is enabled that allows users to join one of a plurality of hosted groups (also referred to as swarms), each group comprising a plurality of users. The user may collaborate with that group, earn scores and/or credits and/or rankings based on his performance with respect to others in the group, and browse the stored output from other groups. In some embodiments, groups can compete with other groups, each of said groups also earning group scores, credits, and/or rankings with respect to other groups.

Referring first to FIG. 1, a schematic diagram of an exemplary collaboration system 100 is shown. Shown are a Central Collaboration Server (CCS) 102, the plurality of portable computing devices 104, and a plurality of exchanges of data with the Central Collaboration Server 106.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
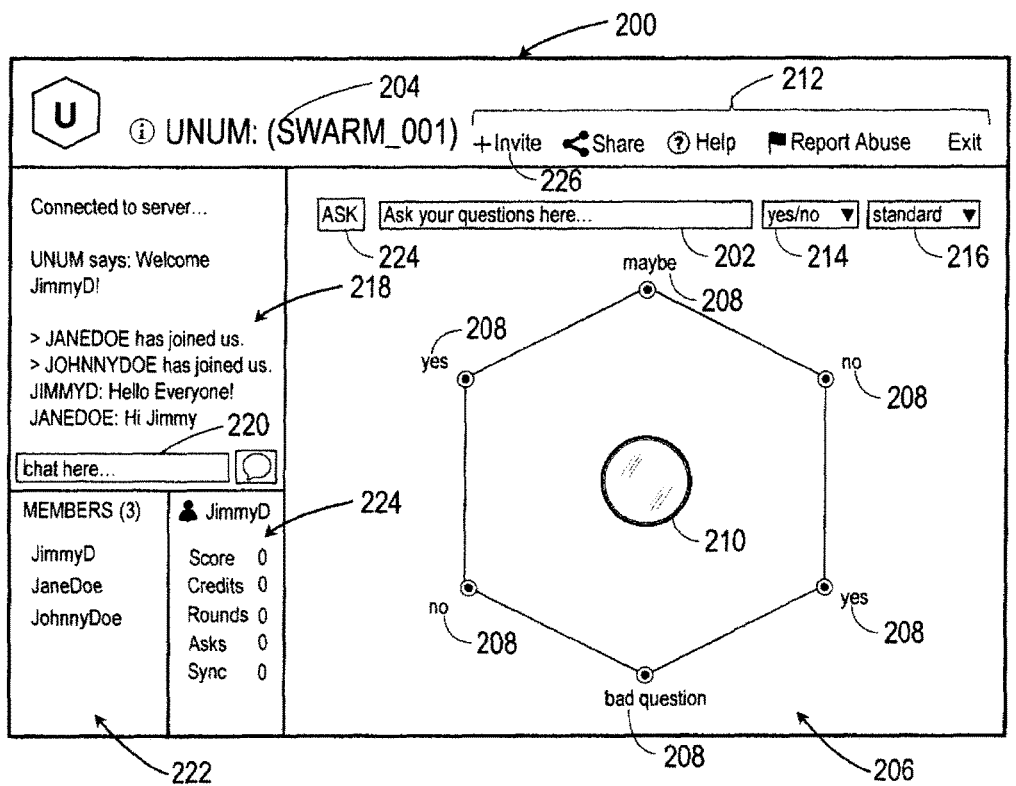
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The graphical pointer 210 is simultaneously displayed to each user by the CIA running on his computing device 104. The pointer 210 displayed to each user appears in a substantially similar position with respect to a set of input choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

As shown in FIG. 2, the CIA software running on each computing device 104 is configured to display a graphical display interface 200 that includes at least one graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "No". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores. The methods for computing sync scores will be described in more detail further below.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "brain freeze!" on the group interface. In addition, in response to receiving the failure indication all users could lose a number of points and/or credits for the collective failure of the group to guide the pointer 210 to a target.

Figure 4:
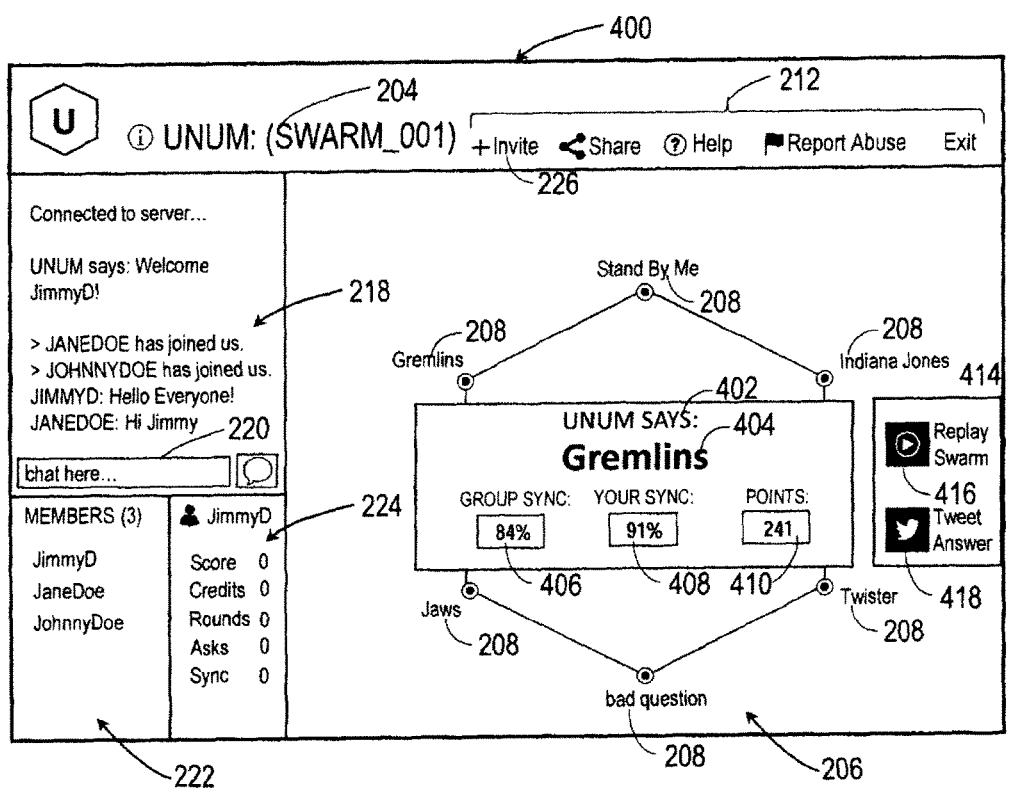
FIG. 4 is an exemplary group display interface of the computing device of the collaborative system after the collaboration session has been successfully completed.

The system 100 is configured to determine that a target is achieved when the group successfully positions the pointer 210 over one input choice 208 for more than the threshold period of time. When the group targets one input choice 208, the target is displayed on the CIA screens of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
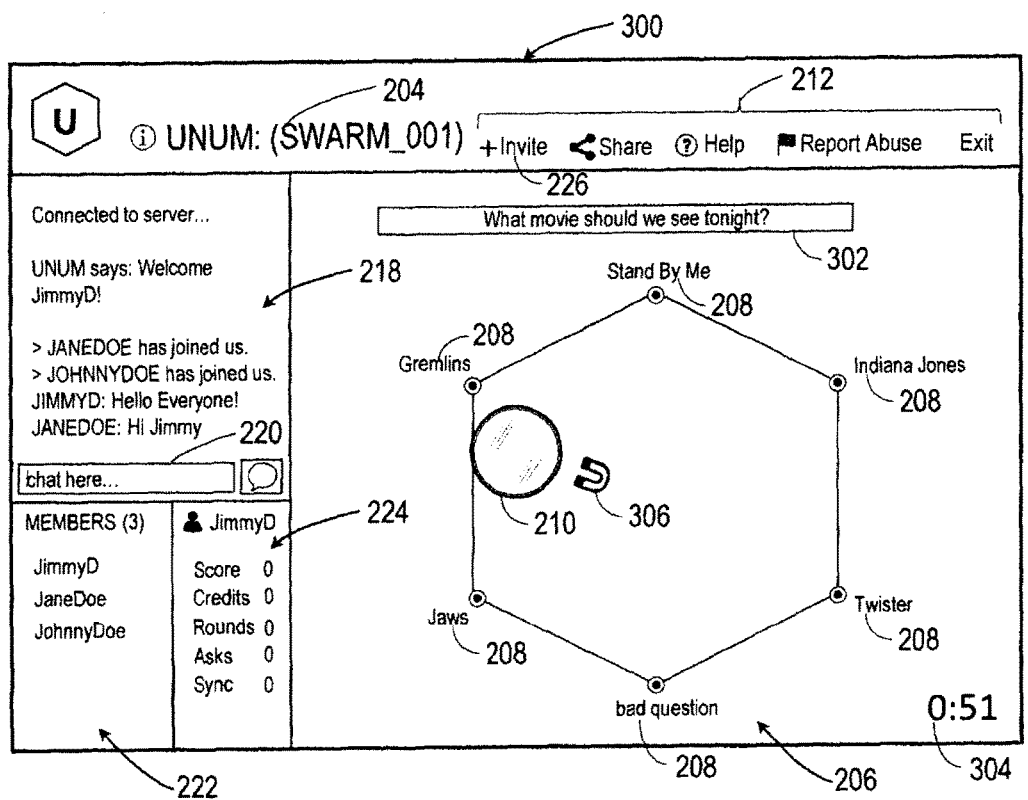
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/473,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values or performance values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync 5" synchronicity value can be computed as that user's average synchronicity value (also referred to as the average performance value) over the last five sessions. This is a highly useful value for it indicates how cooperative the user has been over a recent period of time. The "sync_5" synchronicity value can be used in combination with other time-histories, such as a "sync_50" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14/708,038 discloses some methods of computing the group cohesiveness score, such as to compute a running average of the absolute value (i.e. magnitude) of the group intent vector over time. The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the portable computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet® the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "#UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
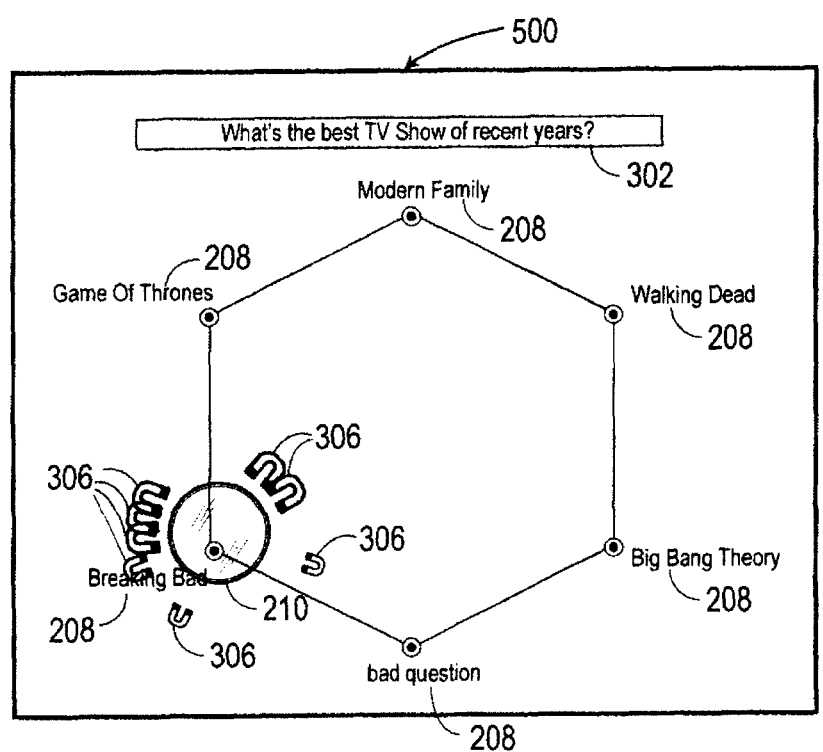
FIG. 5 is a frame of an exemplary collaboration session replay video

Referring next to FIG. 5, a frame of an exemplary session replay video 500 is shown. Shown are the target area 206, the plurality of input choices 208, the question display 302, and the plurality of magnet icons 306.

As shown in FIG. 5, the session replay includes the question asked, the input choices 208, and the graphical indication of the trajectory taken by the pointer 210 during the answer period. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed. In some embodiments, the software running on the local user's computing device 104 can be configured to show all magnet icons 306 in the replay as a uniform color except for the magnet icon 306 representing the time-history of that particular user's input. For that user, the magnet icon 306 can be shown as an alternate color with visual contrast. In this way, the user can observe the swarm of many magnet icons 306 as the history of the session is replayed and identify his or her own magnet icon* among the swarm of many magnet icons 306 because his own magnet icon 306 is displayed in the alternate color. To enable this, the local software on each computing device 104 is configured to identify which magnet icon 306 in the replay is associated with the user of that computing device 104. Such identification can be achieved by associating each magnet icon 306 in the replay with a unique user ID value stored in memory.

As disclosed herein, the present invention employs a number of inventive systems and/or methods for dynamically modifying the configuration of the group to optimize the performance of that group over time. More specifically, each group is a collection of intelligent members (users) that are networked together in real-time, each of them providing collaborative input that's numerically combined into a singular intelligent output. To optimize the performance of a given group, a number of approaches have been developed, which can be used alone or in combination.

A first approach is to dynamically modify the swarm population by purging the swarm of one or more of its currently low-performing members (the input from said members determined to be substantially out of sync with collaborative will of the swarm, i.e. having a low synchronicity value) and/or setting a statistical threshold associated with a given group that bars non-compatible and/or low-performing members from joining that given group. These techniques modulate the make-up the group in real time, by filtering the addition of new members and/or moderating the ejection of low-performing members, all with the goal of maintaining a group configuration that behaves with high levels of collaboration.

A second approach is to dynamically modify the connection strengths within a given group population by adjusting the weighting assigned to the inputs from each individual user, the weightings assigned to each given user being modulated to improve overall group performance. More specifically, the CCS 102 software is selectively configured to increase the weighting of inputs from high-performing members of the group in terms of their collaborative behavior, and decrease the weightings of inputs from low-performing members of a swarm in terms of their collaborative behavior.

In order for the CCS 102 to purge users from the group, institute thresholds that limit entry into the group, and/or dynamically modify the connection strengths within the group, the CCS 102 must quantify swarm performance as well as user performance in the context of collaboration, for determining levels of collaborative performance is used as the basis for dynamic modulation of the group. To perform such quantification, the group cohesiveness score (representing the group synchrony) and the user synchronicity value (synchrony value) is used.

In the context of the collaborative swarming inventions disclosed herein, and as disclosed in the related applications, "synchrony" is defined as a statistical measure of collaboration within and among members of a real-time networked swarm. More specifically, "synchrony" is determined computationally by the software running on the CCS 102 based on the degree of alignment (in direction and magnitude) among the user input collected from all member of a swarm during a response. Because the degree of alignment changes at every time-step, the software running on the CCS 102 is configured to integrate over the response period, producing time-weighted average. In this way, the synchrony computed during a single question/answer session is the time-weighted average of the instantaneous synchrony (i.e. alignment among input vectors) across all time steps.

Further, the two types of synchrony are computed by the CCS 102 software and communicated to each of the peers: group synchrony and individual synchrony. These are described in detail as follows:

As previously disclosed in application Ser. No. 14/708, 038, the group cohesiveness score is an indication of the collaborative coordination of the group as it answers a question or completes a task, derived by computing the degree of alignment among the full set of user intent vectors from all participating users in the group, integrated across all time steps of the session. In many current embodiments, this value is expressed as a percentage between 0% and 100%. In many embodiments, the computation is configured such that if, in theory, all of the users of a group coordinate perfectly during the session (i.e. all users impart input vectors of the exact same magnitude and direction at every time step across the session), that group would deemed to have a group cohesiveness score of 100%. In practice, this rarely happens. Ideally, the outcome of the session is one where the central tendency of the group leads to a coherent answer through the motion of the pointer 210. This generally translates into a group cohesiveness score between 65% and 90%. Conversely, if all members of the group are pulling in the exact opposite directions (i.e. all user intent vectors perfectly cancel out), the pointer 210 will not move at all, resulting in a stalemate. This translates into the group cohesiveness score of 0%. In practice, this too rarely happens. That said, the inventive system still identifies unproductive swarms where the pointer 210 sputters, moving in one direction and another, but never finds enough consensus to drive the pointer 210 to the answer. Such sessions generally have the group cohesiveness score of between 10% and 35%.

Thus, an effective group will have the high group cohesiveness score (>65%), while an ineffective group, unable to converge on answers will have the low group cohesiveness score (<35%). Groups with the group cohesiveness score of around 50% will generally converge on coherent answers, but the group's "conviction" in those answers will not be as strong as sessions with the higher group cohesiveness score. To encourage convergent groups, the CCS 102 software is configured to measure and report the group cohesiveness score to every user after every session (i.e. every collaborative answer). By giving users a direct and easy to understand measure of the collaborative coherence of the group, they can understand if the group is performing well together and adapt their actions accordingly. Further, when points (or credits) are awarded to members of the group, the points are scaled by group cohesiveness score. Thus all users are rewarded when the group shows high synchrony (i.e. strong collaboration) by having a high group cohesiveness score, for they were able to converge on an answer with high conviction. By rewarding individual members for the level of cooperation achieved across the group, all users are incentivized to seek common ground, guiding the pointer 210 to the answer that best satisfies the collaborative will of the entire group. This is a very powerful and important method of driving coherent group.

Of course some users may be deliberately divergent, while other users will be contributing greatly to the overall cohesion of the swarm. To quantify these differences, we compute the user synchronicity value for every user. Like the group cohesiveness score indicating the degree of group synchrony, the user synchronicity value is a time-weighted average that's integrated across all time steps, but in this case the synchronicity value is a measurement of how well aligned a single user is with respect to the group as a whole. Because the synchronicity value is personalized for each user, the CCS 102 software must compute the user synchronicity value independently for each member in the group, indicating how well aligned that user's input vector was with the overall group input vector. The user with the high synchronicity value (>65%) during the session is deemed to have been highly supportive of the resulting consensus, contributing to the emergent response. Conversely, the user with the low synchronicity value (<35%) during the session is deemed by the software to be obstructionist, standing in the way of compromise and consensus.

To encourage constructive behavior from participants, the CCS 102 software measures and reports each user synchronicity value after each session sending each user their personal user synchronicity value for display on their own computing device 104. In addition, when points (or credits) are awarded to the user, the number of credits or points is based at least in part on that user's user synchronicity value and/or the group cohesiveness score. In some current embodiments of the invention, user points (or credits) are awarded based 60% on that user's user synchronicity value and 40% on the overall group cohesiveness score. In this way, users are incentivized to perform collaboratively as individuals, while also being incentivized to push the swarm to behave collaboratively overall. This is highly effective.

Figure 6:
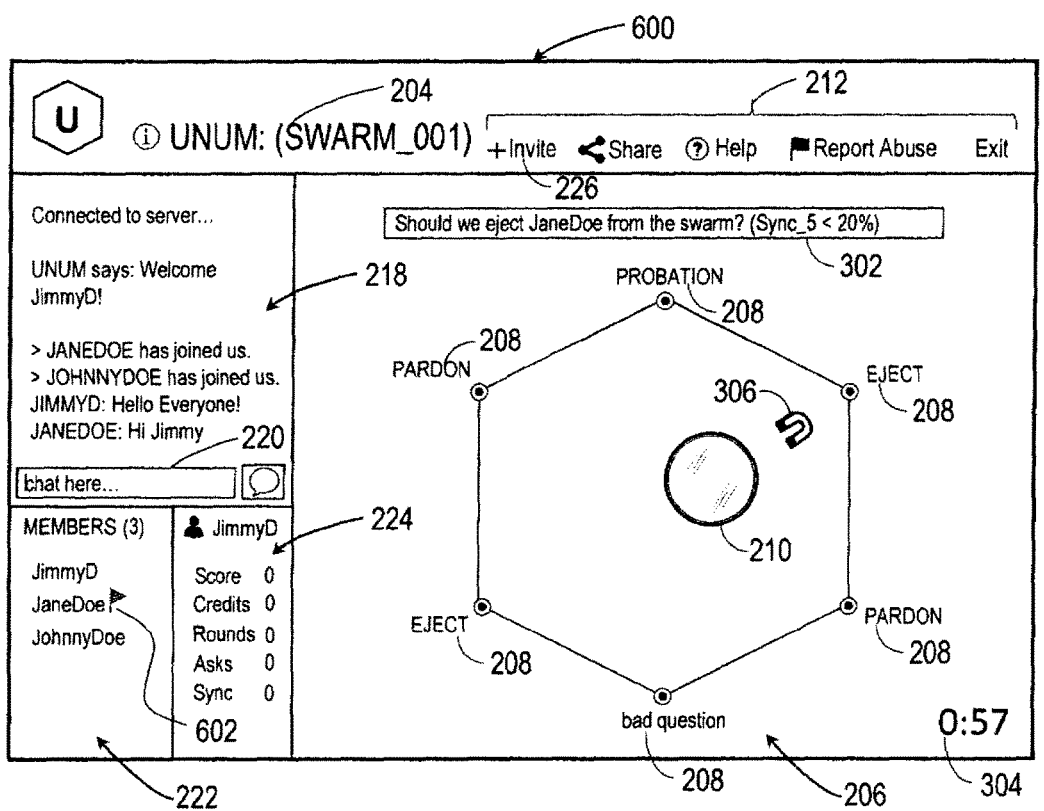
FIG. 6 is an exemplary display interface during a collaboration session determining whether to eject a specific member from the group.

Referring next to FIG. 6, an exemplary display interface 600 is shown during a session determining whether to eject a specific member from the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, the magnet icon 306, and the flag icon 602.

Each group is configured to be able to eject or purge members of the group who consistently show low user synchronicity values over a certain number of sessions. In current embodiments, the determination is based on a user's average user synchronicity value over the last 5 sessions (referred to herein as that user's "Sync_5" synchronicity value) In the true spirit of collaboration, "banishment decisions" are posed to the group itself, which uses collaborative motion of the pointer 210 to decide if an identified low-performing member should be banned for low performance. The benefit of using the Sync_5 user synchronicity value is that users are not punished for a single divergent answer, or even a few divergent answers, but a string of them. This helps to differentiate between users who just disagree with a single question versus users who are deliberately being obstructionist to the swarm's overall performance. In some embodiments, the Sync_50 is also computed, which is the time average of the user's user synchronicity value over the last 50 session. This value is used in combination with the Sync_5 user synchronicity value when ejecting users from the group. This allows users to rewarded for long-term collaborative behavior. The Sync_5 user synchronicity value and the Sync_50 user synchronicity value are effective, but obviously values averaged over a different number of sessions could be used by the CCS 102 software. The key is for the software to assess a time-history of the user's user synchronicity values when determining banishment (or suggested banishment). Similarly, entry into the group can require that the user's Sync_5 user synchronicity value and/or Sync_50 user synchronicity value be above a defined threshold. This allows some groups to be highly selective, only allowing users with a track record of being collaborative members.

In fact, the present invention enables the user to create a new group by giving the new group a name, assigning it a theme, and including a description of the new group's intent and/or philosophy. In addition, the user creating the new group can assign an entry threshold value that indicates a level of historic user synchronicity value that an individual user must attain to gain access to the new group. In some embodiments the Sync_50 user synchronicity value is used. In such embodiments, the group creator might indicate that only users with a Sync_50 greater than 35% can enter the new group. This ensures that deliberately obstructionist users (based on historical performance) can't enter. The system of the present invention enables a virtual lobby interface 800 included in the display interface, the virtual lobby interface 800 indicating a plurality of distinct groups for users to join, each of the plurality of groups having a different entry threshold, or optionally no entry threshold. This enables selective groups and open groups. Users who want to have access to selective groups are thereby motivated to perform collaboratively when using the system.

Shown in FIG. 6 is an exemplary user display interface that supports the purging methodology described herein. In this example, the CCS 102 has identified that a member of the group has been assigned a Sync_5 user synchronicity value below the pre-assigned threshold (for example, a user synchronicity value below 20%). In response to this automated trigger, the CCS 102 software sends an automated question to all members of the group, asking if the low-performing member should be purged from the group.

More specifically, the question automatically posed to the group by the CCS 102 includes the unique user name of the low performing member ("JaneDoe" in the exemplary session) and an indication of the threshold that was fallen below ("Sync_5<20%" in the exemplary session). The members of the group then engage in the collaborative session, providing input in real-time that is numerically combined into the group intent. In this example, the CCS 102 software automatically sent each member of the swarm a target area including the input choices 208. In this example the set of six input choices 208 includes: "eject", "pardon", "probation", "eject", "pardon", and "bad question". The users then collaboratively provide input, enabling the swarm intelligence to converge on the target answer. If the answer is "eject", the identified user is ejected from the swarm and banned from re-joining the group for either a set amount of time, a set number of sessions, or until his or her user synchronicity value rises above the threshold level. The virtual lobby interface 800 is described further below in FIG. 8. If the answer is "pardon", the identified user is excused of his divergent behavior and is allowed to remain in the group at the present time. If the answer is "probation", the CCS 102 software is configured to monitor the future user synchronicity values for that user, giving that user a defined amount of time (or defined number of session) to raise his user synchronicity value above the defined threshold. For example, the user may be required to get his Sync_5 user synchronicity value above 35% within the next ten sessions, or ejection of that user will automatically be executed by the CCS 102.

In some embodiments, one user of the group can initiate a purge session by clicking on a particular user's username (as shown in the list of current members) and selecting a "purge user" option from the board selection drop-down menu 214. In preferred embodiments, this can only be done if the user synchronicity value or other measure of performance of the user to be purged has fallen below the threshold value. In some such embodiments, the flag icon 602 appears in the list of current members next to the usernames of users whose user synchronicity value fell below said threshold, thus alerting the other members of the low performance, and alerting the other users that such "red flagged" users can be selected for possible purge question put to the group. As shown in FIG. 6, in the list of members the user JaneDoe has the flag icon 602 shown next to the username, indicating that user JaneDoe has the user synchronicity value below the threshold.

In some embodiments, the CCS 102 does a periodic purge that does not identify the specific username of the potentially purged user when posing the question to the group. For example, in one such embodiment, the CCS 102 automatically sends the question—"Should we purge the lowest performing member of the group?" The group must now respond. The dynamic is interesting because members of the group do not know if they are the lowest performing member. In some such embodiments, such purge sessions are triggered at regular time intervals. In other embodiments, such purge sessions are triggered when the group cohesiveness score falls below a threshold. This is highly effective because the group cohesiveness score is a representation of how collaboratively effective the group is. If the group is not being highly collaborative, as indicated by the low group cohesiveness score, it's a very effective technique for the CCS 102 to ask the group if it wants to eject its lowest performing member as a means of boosting performance. In large group, the CCS 102 can be configured to ask "Should we PURGE the lowest performing 10% of our members?" This enables the swarm to purge many members at once if they are not performing well. Again, the dynamic is quite interesting and engaging for users because they don't know if they are among the lowest 10% that will get purged. In this way, the swarm can self-moderate itself, enhancing its own configuration for optimal performance, with assistance from the automated agent of the CCS 102 software.

Figure 7:
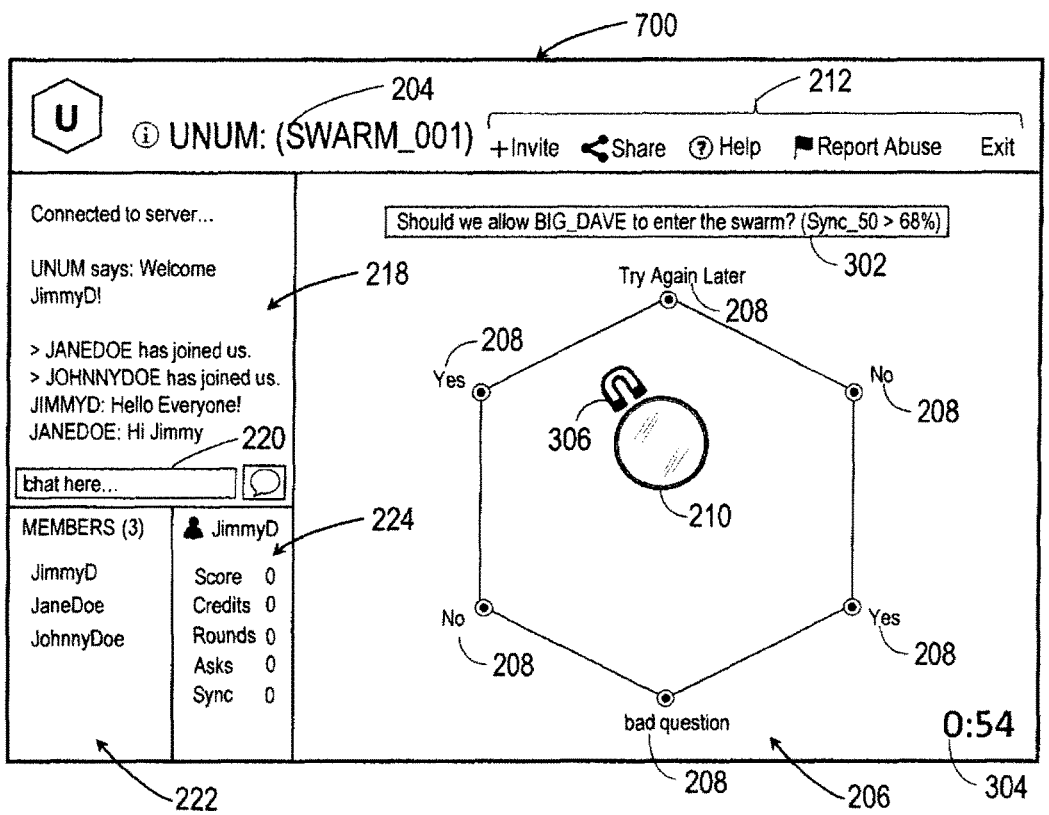
FIG. 7 is an exemplary display interface during a session determining whether to allow a specific member to join the group.

Referring next to FIG. 7, an exemplary display interface 700 is shown during a session determining whether to allow a specific member to join the group. Shown are the prompt bar 202, the group name 204, the target area 206, the plurality of input choices 208, the pointer 210, the communication menu 212, the chat window 218, the chat input box 220, the current member list 222, the statistics display 224, the invite button 226, the question display 302, the countdown clock 304, and the magnet icon 306.

In some embodiments of the present invention, the collaborative group is not only empowered to make collaborative decisions about ejection from the swarm, but is empowered to make collaborative decisions about entry into the swarm. In such embodiments, the swarm can be configured when created to be "swarm admit only" in which case, users must be collaboratively granted access. This designation (or similar designation) is displayed in the system lobby display. If the swam is identified in the lobby display as "swarm admit only", the user may not immediately join the group, but the user may select a displayed button marked "knock". When a user knocks on a swarm (i.e. selects the knock button, whereby an indication is sent to the CCS 102 indicating that that user is requesting to join that particular group), the CCS 102 software is alerted that the user wants to enter that particular swarm and because that swarm is listed in the CCS 102 database as being "swarm admit only", the CCS 102 software executes a routine that puts the admission question to the group. The swarm intelligence can then collaboratively decide if it wants to allow the given user to join, or reject the request for admission.

As shown in FIG. 7, the CCS 102 has received an indication that the user BIG_DAVE has indicated that he or she wishes to enter the group "Swarm_001". Further, responsively the CCS 102 determined that the group Swarm_001 has been configured as "swarm admit only". In response to these conditions, the CCS 102 performs the automated routine in which it sends the question to the current users in group Swarm_001, asking if the user should be allowed to join the swarm.

More specifically, the question automatically posed to the swarm by the CCS 102 includes the unique username of the user requesting entry into the group ("BIG_DAVE") as well as an indication of that user's historical collaborative performance ("Sync_50=68%"). In some embodiments, a user rank is used instead of the user synchronicity value, indicating where that user's performance falls within the overall spectrum of users of the system. In some embodiments the CCS 102 determines an ordered rank of a plurality of users based at least in part upon at least one synchronicity value associated with each of the plurality of users. In some embodiments the CCS 102 determines an ordered rank of a plurality of groups based at least in part upon at least one group cohesiveness score associated with each of the groups In addition, the CCS 102 might provide a link to further stats or information about that user, possibly including a link to his or her Facebook® page or Twitter® handle. In this way, the members of the swarm can assess who this user is, and how collaborative this user has been during his prior participation within the system.

The current members of the swarm SWARM_001 then engage in the collaborative control process, providing input in real-time that is numerically combined into a singular intent of the swarm intelligence, as shown by FIG. 7. In this example, the CCS 102 software automatically sent each member of the swarm a set of input choices 208 related to allowing user entry to the group. In this example the set of six input choices 208 includes: "no", "yes", "not now", "yes", "no" and, "bad question". The users then collaboratively engage, enabling the swarm intelligence to converge on the target input choice 208. If the target is "yes", the identified user is granted entry into the swarm. If the target is "no" the identified user is not granted entry into the swarm. If the target is "not now" the identified user is informed by the CCS 102 software: "maybe . . . try again later." In this way, the collaborative swarm intelligence can control its own population, deciding who is granted entry and who is rejected. This, combined with the ability to purge members, allows for a dynamic optimization of the swarm's overall makeup, both through automated processes and by direct swarm intelligence control.

As also disclosed herein, the swarm can be configured to dynamically adjust the group configuration, not only by selectively ejecting users from the swarm and/or admitting members to the swarm but by adjusting the relative weighting of the input received from current members of the swarm. More specifically, in some embodiments, dynamic algorithms are used to increase the weighting that certain users have upon the collective pull of the pointer 210, while decreasing the weighting that other users have upon the collective pull of the pointer 210.

More specifically, the CCS 102 can be configured to compute and store a weighting value for each user, based on that user's historic user synchronicity values. Users who show a time history of high user synchronicity values are assigned a positive weighting value, while users who show a time history of low user synchronicity values are assigned a negative weighting value. These weighting values are updated regularly by the CCS 102, ideally after each session that a user participates in, because the user's performance during that session likely resulted in a change in his historic user synchronicity value. In this way, the swarm intelligence is adapted over time, strengthening the connections (i.e. input weighting) with respect to the more collaborative users in the swarm, and weakening the connections with respect to the less collaborative users in the swarm. Hence, the collaborative swarm is dynamically adjusted in an innovative manner reminiscent of the neural networks within biological brains that optimizes its intelligence by adjusting connections.

In one specific embodiment, the CCS 102 computes the Sync_5 user synchronicity value and Sync_50 user synchronicity value for each user, based on the user's performance during multiple sessions. For example, the user might have participated in 50 sessions as a member of multiple groups. Thus the Sync_50 user synchronicity value that is stored and updated on the CCS 102 (and related database) is swarm-independent.

When inside a particular group, the CCS 102 computes the weighting value for that user based on his Sync_5 user synchronicity value and Sync_50 user synchronicity value (reflecting the user's user synchronicity value over the last 5 and last 50 questions respectively). In one such embodiment, the weighting value is computed as follows:

User Weighting=0.04*(Sync_50−50)/50+0.06*(Sync_5−50)/50

This equation assigns a weighting value that's 40% dependent upon the user's Sync_50 user synchronicity value and 60% dependent upon the user's Sync_5 user synchronicity value, thereby giving greater importance to the user's more recent behavior, but still considering the longer term behavior of that user. Further, this equation is structured mathematically such that users who earn user synchronicity values at or near a neutral performance level of 50% have no change in weighting, and users who have user synchronicity values much higher than the neutral value of 50% have a higher weighting, this higher weighting value topping out at +10%. Users with user synchronicity values substantially below 50% are computed to have a negative weighting value that maxes out at −10%.

In this way, across a population of users, most will have close to the neutral weighting value at or around 0%, but those users who have shown a very high capacity for collaborative behavior can earn a boost in their weighting value up to +10%, while those who have shown a high tendency for obstruction can be penalized with a drop in their weighting value of as much as −10%. While the spread from −10% to +10% does not seem that significant, it means that a high performing user will easily overpower the input from a low performing user, tipping the converge trend towards the more collaborative members. (It should be noted that weighting values could be defined with a larger range, for example −20% to +20%).

In addition to the processes that allow the group to adapt over time, changing the dynamics by which questions are collaboratively answered, the present invention includes one or more user-selectable mode when asking a question that also changes the dynamics of the collaborative answer. For example, the present invention includes a user selectable mode called "gravity mode" that is accessible from the physics selection drop-down menu 216. The gravity mode is engaged during the session such that the pointer 210 experiences the restoring force that pulls the pointer 210 back to the point substantially centered among the plurality of the given input choices 208, the restoring force a function of distance from the center.

This creates a new collaborative dynamic in which members of the group must provide user input with a collective force that overcomes gravity in order to position the pointer 210 on one of the plurality of input choices 208. This significantly alters the swarm dynamics, for it now requires more than a simple plurality of users providing input to the pointer 210 in a substantially synchronized manner in order to position the pointer 210 on the target. In the standard non-gravity mode, if there were 100 users, with 51 pulling towards one answer, and 49 pulling towards another, the 51 would likely be able to position the pointer 210 on the desired target. But with gravity of sufficient restoring force, the system can be configured to require that at least 80% (i.e. 80 users of the 100 in the group at the present time) are pulling in a substantially similar direction to overcome gravity and position the pointer 210 on the desired target. This mode thus enables a high barrier for collaborative decision making, requiring the group to have more "conviction" in the resulting response.

In some embodiments, the level of gravitational force is user-selectable, thereby adjusting the level of conviction required to overcome gravity and reach the target answer.

Figure 8:
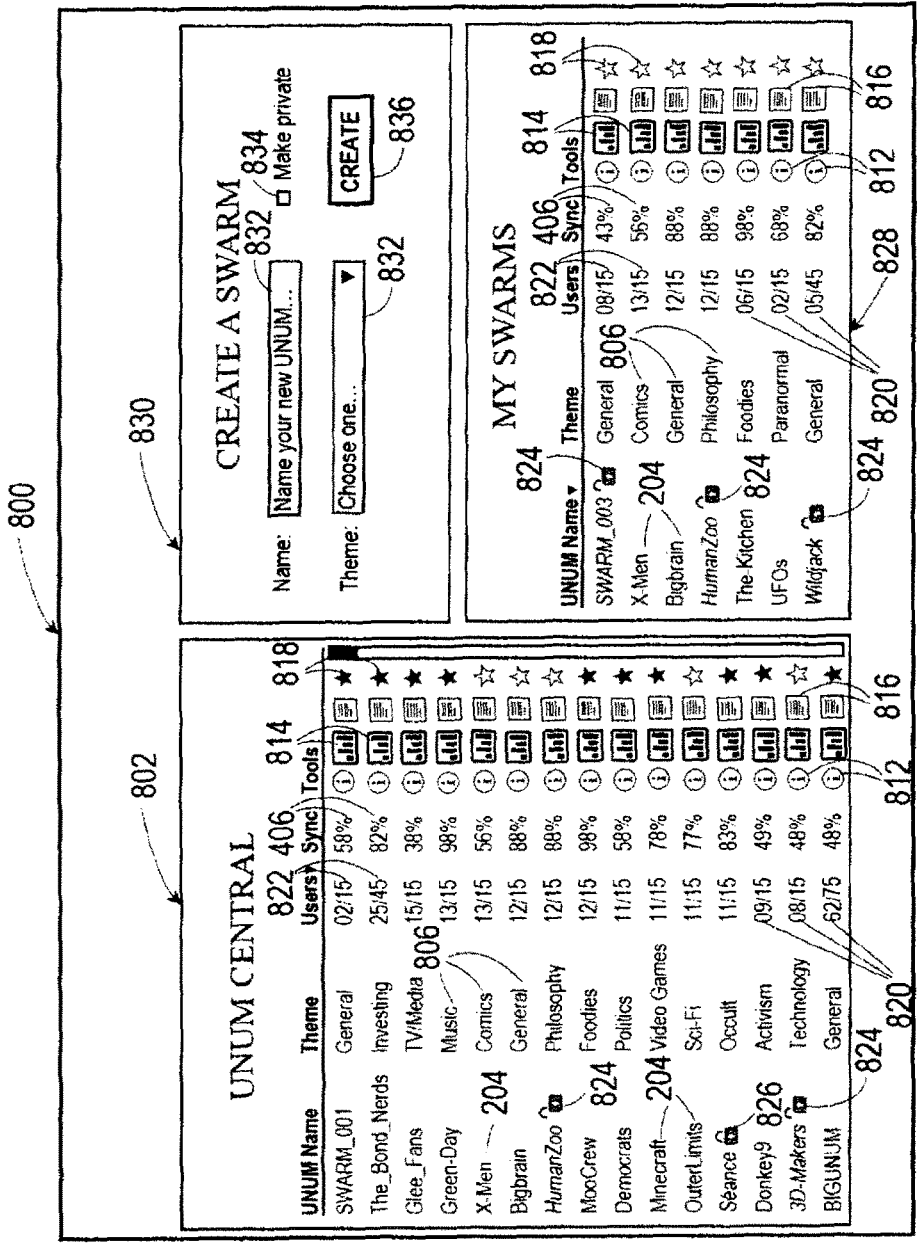
FIG. 8 is an example display interface of the virtual lobby interface.

Referring next to FIG. 8, an example display interface of the virtual lobby interface 800 is shown. Shown are a group directory 802, the plurality of group names 204, a plurality of group themes 806, a plurality of group cohesiveness score indications 406, a plurality of information icons 812, a plurality of statistics icons 814, a plurality of log icons 816, a plurality of favorites icons 818, a number of users in the group 820, a plurality of maximum number of users 822, a plurality of unlocked icons 824, a locked icon 826, a favorites section 828, a swarm creation section 830, a plurality of user input areas 832, a make private selection box 834, and a create button 836.

The virtual lobby interface 800 is accessible to computer users on computing devices 104 either through the CIA running on their computing device 104, or through a standard web browser (if the virtual lobby interface 800 is created as a standard html webpage). As shown in FIG. 8, the virtual lobby interface 800 includes the group directory 802 of available groups that users can join and then participate in real-time collaborative intelligence processes. The virtual lobby interface 800 is not real-time, but employs more traditional methods known to the art when joining chat rooms. The virtual lobby interface 800 is divided into a number of sections. One section is the group directory 802 labeled as "UNUM Central". Using the group directory 802, users can browse the available groups, each of said groups being associated with a theme that governs the type of questions that users will ask.

The group directory 802 in the embodiment shown comprises a table, with a row for each group included in the directory. Information included in the row for each group includes the group name 204, the group theme 806, the current number of users in the group 820, the maximum number of users 822, and the current group cohesiveness score. The group theme 806 is a general description of the area of focus for the group, for example, investing, music, politics or technology.

If the group cohesiveness score is low, users may not want to enter that swarm because it means the group is not being highly collaborative. The low group cohesiveness score impacts the enjoyability of the session as well as limits the scores (credits) that users can earn.

Also included in the row for each group is a plurality of tool icons. Included in the tool icons of the exemplary lobby interface 800 of FIG. 8 are the information icon 812, the statistics icon 814, the log icon 816, and the group member icon. When the user selects the information icon 812 for one group, a display of additional information about that swarm is shown. When the user selects the statistics icon 814, a display of statistics of the group is shown. Statistics may include a number of questions asked by the group during one or more periods of time, an average number of users that participated in the group during one or more periods of time, and the average group cohesiveness of the group during one or more periods of time. The average group cohesiveness may be determined by finding the mean of a series of repeated group cohesiveness scores over a specific period of time. In some instances the mean is time-weighted such that time-steps near the end of the time period are more heavily weighted than time steps near the start of the time period. In some embodiments the period of time may comprise a plurality of completed question-and-answer sessions.

When the log icon 816 is selected by the user, a display of a log prior questions and answers of that swarm is displayed. The log display has been disclosed in the related applications. The log display may optionally include the ability not just to see the questions and answers, but also access the replay of those questions and answers. To achieve this, the CCS 102 archives not just a history of questions and answers for each swarm, but archives the replay data associated with each of said questions and answers. In some preferred embodiments, the replay data includes locative data for the pointer 210 and each of the magnet icons 306, said data stored at regular time intervals over the period of a response to a question. For example, pointer location coordinates along with magnet icon 306 positions, orientations, and size data may be stored every 0.25 seconds during the period of the response to the question. In addition, data related to the pointer 210 being over input choices 208 may also be stored. In some preferred embodiments, magnet icon 306 data is stored relative to pointer 210 location, for example as a distance vector from the center of the pointer 210, the distance vector having a size and orientation relative to the center of the pointer 210.

The favorites icon 818 indicates which of the groups are included in a "favorites" list. In one embodiment the favorites list includes groups that user has selected as favorites, groups that have been created by the user, and private swarms that the user has been invited to. For the groups shown in the portion of the group directory 802 displayed in FIG. 8, the groups includes in the user's favorites are X-Men, Bigbrain, HumanZoo, OuterLimits, and 3D-Makers groups, as indicated by the highlighted (white) star icon. Groups not included in the user's favorites list are indicated by the unhighlighted (black) star icon.

Some groups displayed in the group directory 802 are configured to have limitations to group membership, as previously described. These groups are indicated by either the locked icon 826 or the unlocked icon 824 next to the group name 204. In the group directory 802 portion shown, the HumanZoo and 3D-Makers groups include the unlocked icon 824, indicating that it is currently possible to join those groups if the membership limitations are met. The Séance group includes the locked icon 826, indicating that it is not possible to join that group at this time.

The locked icon 826 may be displayed for one of a plurality of reasons, for example—the swarm may be locked because it is private and requires an invitation or password to be joined by the user. The swarm may be locked because it has an entry threshold such that users must have scores and/or statistics related to their historical performance that are above the entry threshold to be granted access. The swarm may be locked because the swarm is configured to require group approval for new users joining. The swarm may be locked because it has reached its real-time group size limit and thus cannot accept any additional users at the present time.

As also shown in FIG. 8, the swarm creation section 830 allows users to create their own swarm. By entering information into the user input areas 832 of the swarm creation section 830, and then selecting the create button 836, the user can define the name of a new swarm, give the new swarm a theme, and optionally make the new swarm a private swarm that requires a password, by selecting the make private selection box 834. In some embodiments, users are further given the ability to invite their friends to the new swarm by accessing their Facebook® friends and/or Twitter® followers.

As also shown in FIG. 8, the favorites section 828 of the display interface allows users to track swarms that are of particular interest to them. The favorites section 828 comprises a table including the swarms included in the user's favorites list. The favorites section 828 is formatted similarly to the group directory 802 table, including the UNUM name, theme, number of users in the group 820, maximum number of users 822, and icons 812, 814, 816, 818 for each swarm included in the favorites section 828. The favorites section 828 may also include the locked icon 826 or the unlocked icon 824 for the group, as applicable.

In this way, the present invention allows users to enter swarms, exit swarms, and create swarms. The historical performance for users (for example their score, credits, ranking, rating, and synchronicity values) are maintained by the CCS 102 for participation across all swarms. Thus a user can earn points by participating in a variety of swarms, public and private, although they can only be in one swarm at a time. That's because swarms require real-time participation.

In addition to defining the name, theme, and password of a given swarm, users are given the ability to configure new swarms by setting parameters that indicate: (a) whether the new swarm is private or public, (b) whether the new swarm supports adaptive weighting or all users should always have equal weighting, (c) whether the swarm supports automated purging or the purging of users should always be user initiated, (d) whether the swarm is supports "swarm admit only" or anyone can join the swarm without the swarm intellect making an assessment, (e) whether the swarm supports an entry threshold and if so, what level it should be, (f) whether the swarm supports an ejection threshold and if so, what the level should be. In addition, each swarm can be linked to one or more official Twitter® accounts, for the sending of Tweets that represent the official voice of that swarm intelligence.

To enhance collaborative experiences among real-time synchronous users over a distributed network, additional novel systems and methods have been developed for enabling members of a swarm to selectively ask a question to the group and then collect suggestions from other members of that group which populate the possible answers displayed to the group. The group then collectively selects an answer from among the options submitted, using real-time synchronous control. To achieve such coordination across a distributed network, various systems and methods have been developed.

This technique is referred to herein as "suggestion mode". Although uniquely powerful, it can be conceptualized as an enhanced version of the "custom mode" disclosed in co-pending patent application Ser. No. 14/473,768, filed Jun. 12, 2015. In the custom mode, an individual user can ask a question and provide a custom set of answers that the swarm will choose from. In suggestion mode, the user asks a question, but then indicates that the custom choices are to be collected from a plurality of other members of the swarm. Under the coordination of the CCS 102 software, these suggestions then populate the displayed choices, through sophisticated coordination with the CIA software running on each computing device 104. To enable this, a novel series of steps are required.

Figure 9:
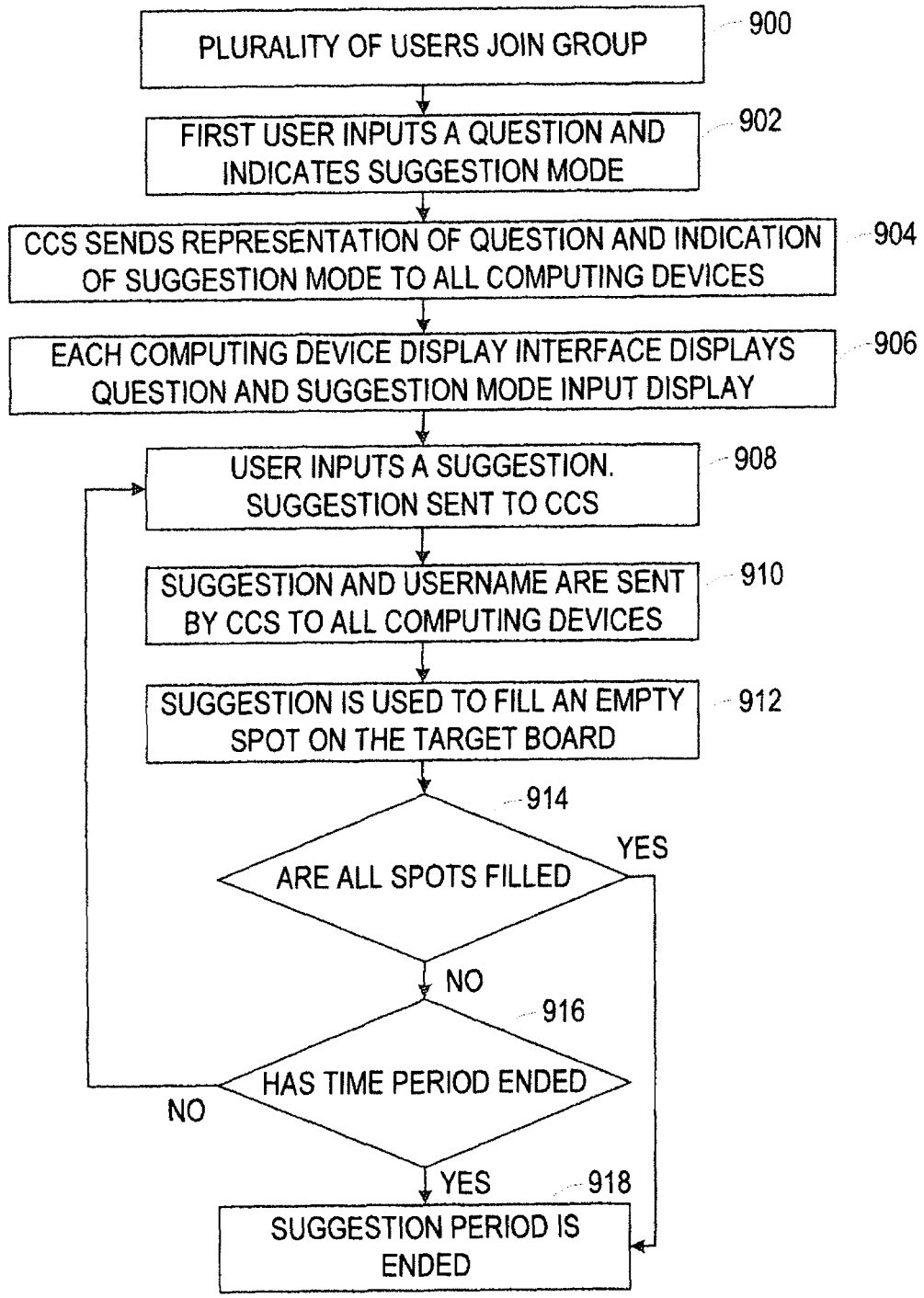
FIG. 9 is a flowchart diagram of a suggestion process of the real-time collaborative system.

Referring next to FIG. 9, a flowchart diagram of a suggestion process of the real-time collaborative system is shown. Shown are a first join group step 900, a user input question step 902, a send question to all devices step 904, a display question and suggestion mode step 906, a user inputs suggestion step 908, a CCS sends suggestion step 910, a fill target area step 912, a spots filled decision point 914, a time period decision point 916, and a suggestion period ended step 918.

In the first join group step 900, a plurality of users join one group (or "swarm") at the same time, thereby comprising a specific real-time collaborative group of users. Joining the group can be achieved by each user accessing the lobby interface 800 through the CIA and selecting the specific group from the plurality of available groups. Alternatively, joining the group can be achieved by creating a new group using the swarm creation section 830 of the virtual lobby interface 800. Alternatively, joining the group can be achieved by responding affirmatively to an invitation from another user, either by email, over Facebook®, over Twitter®, over Google Hangouts®, or using some other social networking platform that links users. Upon joining the group, the CCS 102 sends a message to the CIA software running on the joining user's individual computing device 104, providing information related to joining that group, such as that user's current status data and/or group current status data. Also sent to the CIA software running on that user's computing device 104, is a list of user names of other current users who are participating in this real-time group.

Having joined the group, each user in the group is running the CIA on his own computing device 104 and is thereby provided with the display interface that enables them to simultaneously view the graphical pointer 210, said pointer 210 being substantially co-located across computing devices 104 as displayed with respect to the set of graphical input choices 208. The input choices 208 are also referred to as "answer choices", as the users are choosing from the plurality of answer choices 208 to arrive at the answer, i.e. the plurality of answer choices 208 comprises the set of possible answers. Each user is also provided by the CIA with the prompt bar 202 by which they can enter a textual question to be asked to the group. Each user is also provided by the CIA software with the board selection drop-down menu 214 or other similar interface, by which they can select from among the set of standard target areas 206 to be associated with the asked question, each of said target areas 206 comprising the spatially arranged set of input choices 208. The board selection drop-down menu 214 also allows users to choose a custom mode, wherein the user can enter a set of custom-defined input choices 208. The board selection drop-down menu 214 also allows users to choose the suggestion mode to be associated with the current question, the suggestion mode being the one that is selected for the set of methods described herein.

In the next user input question step 902, a first user types a question the prompt bar 202, selectively indicating to the CIA software that this question should be asked in suggestion mode, using the board selection drop-down menu 214 or other graphical or textual element, and then clicks the ask button 228 to input the question to the CIA. For example, the user might have joined a group of 10 friends, and asked "Where should we go for dinner tonight?" by entering it into the prompt bar 202, and indicated that it should be answered using the suggestion mode, by selecting that from the board selection drop-down menu 214. A similar display interface is shown below in FIG. 10. The process then proceeds to the send question to all devices step 904.

In the send question to all devices step 904, the CIA sends a representation of the question (such as a text string) to the CCS 102, along with the identity of the associated user and an indication that the question is to be answered in suggestion mode. The CCS 102 then determines if the question is a valid question and whether the question has priority over other questions that may have been received from other users. If the question is valid and has priority, the CCS 102 determines that this will be the currently active question that is posed to the group. The CCS 102 then sends a representation of the question, along with an indication that it is to be answered using suggestion mode, to each of plurality of computing devices 104 associated with the plurality of users who comprise the group.

In the next display question and suggestion mode step 906, the CIA of each computing device 104, in response to receiving the representation of the question and the indication of suggestion mode from the CCS 102, updates the display interface to display the question and a graphical and/or textual indication that the question is to be answered in suggestion mode. For example, the CCS 102 might send the textual question "Where should we go for dinner tonight?" the computing devices 104 of 11 networked friends who comprise the current group, along with the indication that this question is to be answered using suggestion mode, whereby the display interfaces of the group are updated.

The CIA on each computing device 104 of the group executes the suggestion process where it (a) displays the received question, and (b) displays a suggestion dialog box 1004, indicating that suggestions are desired as possible answers to this new question. In many preferred embodiments, display of the question and the suggestion dialog box 1004 is coordinated to happen at substantially the same time upon the computing devices 104 of all plurality of members of the group. In this way, the members of the group are all informed at the same time that a new question has been asked and that suggestions are needed for possible answers. In many preferred embodiments, the suggestion process running on the CIA also presents a suggestion countdown timer 1008 (as shown below in FIG. 10) related to the suggestion request, giving all users a fixed amount of time to collectively enter suggestions. An indication triggering the suggestion countdown timer 1008 is sent from the CCS 102 to each computing device 104 in the group at the start of the suggestion period.

In some embodiments, the CIA software is configured to only allow one suggestion to be entered from each member of the group. In other embodiments, the CIA software is configured to allow users to enter multiple suggestions, one after another, using the suggestion box. In many preferred embodiments, the CIA software is configured to selectively enable both modes depending on either (a) a setting configured by the user who asked the question, or (b) a setting configured by the user who created the group. This setting may be "allow multiple suggestions from each user" and can be set as either yes or no. In an advanced version, the setting is controlled automatically by the CIA and/or CCS 102 software, depending upon the number of the users in a group. For groups that have less than a designated number of users, those users are allowed to provide multiple suggestions in response to a single question posed in suggestion mode. For groups that have more than a designated number of users, users are only allowed to provide one suggestion in response to a question posed in suggestion mode. This adaptive method is highly effective, for small groups often require multiple suggestion from users to keep the process moving quickly. In preferred embodiments, the suggestion countdown timer 1008 may be set to a short amount of time, such as 30 seconds.

In the next user inputs suggestion step 908, one user in the group types a suggestion into a suggestion input field 1006 of the suggestion dialog box 1004 and hits return. The CIA software running on the computing device 104 responsively sends a representation of the suggestion to the CCS 102, indicating the suggestion and a username of the user. It will be understood by those of ordinary skill in the art that multiple members of the group may input suggestions simultaneously.

Figure 11:
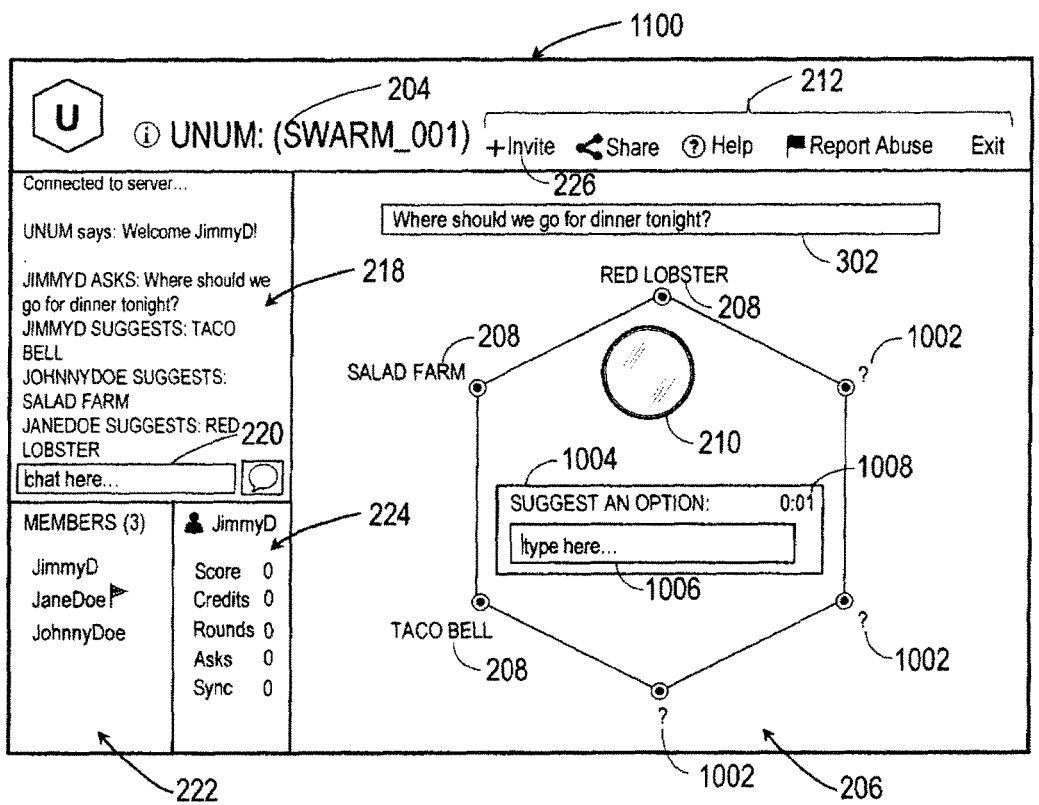
FIG. 11 is an exemplary display interface of the computing device of the collaborative system during a second point in the suggestion process.

In one example, as shown in FIG. 11 below, the user of the computing device 104 shown in FIG. 11 might enter "Taco Bell" into the suggestion input field 1006 of the suggestion dialog box 1004. The suggestion "Taco Bell" along with the username of the user who made that suggestion, is sent from the local CIA software on the user's computing device 104 to the CCS 102, wherein the suggestion mode process is triggered. In this example, the username of that user is "JimmyD".

In the next step, the CCS sends suggestion step 908, the CCS 102 adds the received suggestion to a set of input choices 208 that will be used in responding to this question. The CCS 102 then sends an indication of the received suggestion (and optionally the username of the user who input the suggestion) to all of the computing devices 104 in the group. As shown in FIG. 11, the suggestion "Taco Bell" and an indication that it was made by user "JimmyD" is sent to all computing devices 104 in the group, substantially simultaneously. In preferred embodiments, this happens very quickly because all other users are currently contemplating their own suggestions.

In preferred embodiments, informing is done by graphically displaying the suggestion upon the target area 206. In preferred embodiments, as shown below in FIG. 11 the name of the user who made the suggestion is listed in the chat window 218, for example with text: "JimmyD suggests Taco Bell". This is achieved by the CIA automatically composing a text phrase, using the user name and suggestion, and inserting the word "suggest", allowing the CIA to communicate through natural language.

In the next fill target area step 912, an indication of the suggestion is sent to all computing devices 104, whereby the CIA changes one of a plurality of input choice placeholders 1002 (also referred to as answer choice placeholders) to the input choice equal to the suggestion. In some embodiments, in lieu of updating the target area 206 with the suggestion each time the CCS 102 receives one suggestion, the CCS 102 may select the input choices from the set of suggestions after all suggestions have been received. In some embodiments there is a criteria for using suggestions as input choices, and a suggestion is not added to the set of input choices 208 if the suggestion does not meet the criteria. In yet another embodiment, the set of input choices 208 is ranked and the top input choices 208 are included in the target area 206. The process then proceeds to the spots filled decision point 914.

During the spots filled decision point 914, if all input choice placeholders 1002 for input choices 208 in the target area 206 have each been filled by one suggestion, the process proceeds to the time period decision point 916. If the designated time period has also ended, the process proceeds to the suggestion period ended step 918, suggestion period is over and the CIA updates the display interface to indicate that suggestions may no longer be input.

If all input choice placeholders 1002 on the target area 206 have not been replaced with input choices 208, the process returns to the user inputs suggestion step 908, where the same user or another user inputs a new suggestion. The process then repeats until the time period ends or all positions are filled, in which case the process terminates at the suggestion period ended step 918.

In some cases, the suggestion time period expires before all the input choice placeholders 1002 are filled with input choices 208. In many preferred embodiments, the CCS 102 software is configured to then execute the answer period of the session, leaving the blank spots empty. The CCS 102 software can then be configured not to allow users to collectively pick the input choice placeholder 1002.

If, however, fewer than 2 suggestions were received by the CCS 102 software by the time that the time period is ended, the question is deemed by the CCS 102 software not to be viable. This is because the group needs at least 2 input choices 208 to choose between when answering a question. In such a situation, the CCS 102 software is configured to send a "not enough suggestions" message to each of the computing devices 104. The CIA software on those computing devices 104 then displays a "not enough suggestions" message, and terminates the session. In some embodiments, the users lose points (credits) for the failed attempt, because it was a non-collaborative result. In other embodiments, only the first user (the asker of the question) loses points, for his question failed to inspire a sufficient number of suggestions to proceed.

In response to the end of the suggestion period, the CIA software on each of the computing devices 104 may then start the answer period, as previously described in related applications. The end of the suggestion period may be indicated by hiding the suggestion dialog box 1004, and by enabling the collaborative control of the pointer 210. In some embodiments the CCS 102 sends a message to all computing devices 104 in the group. The message could be a simple trigger message, assuming that all devices 104 in the group already have received the question and the suggestions as they were entered. In some preferred embodiments, this message actually re-sends the question and the set of suggestions, to be sure that none of the computing devices 104 missed some data. Further, this allows for computing devices 104 who joined the group during the suggestion period to be brought up to date as to the current question, and the final set of suggestions.

It should be noted that some advanced versions of the CCS 102 algorithms handle suggestions in a manner which is not simply first-come first-serve, as described above. These methods are used for very large groups where far more suggestions are received than can fill the target area 206. One such method, uses a randomization process to select a suggestion set from a large number of suggestions received. Other such method assigns priority to suggestions received from users who have higher scores, more credits, better performance (synchronicity) values, and/or higher rankings in their stored historical data.

The answer period also includes the countdown clock 304 indicating how much time is left for the group to collaboratively control the pointer 210 and target an answer. In many embodiments, this counter starts at 60 seconds. From here, the process proceeds using the methods for answering questions disclosed above, and in the co-pending patent applications that have been incorporated by reference.

Figure 10:
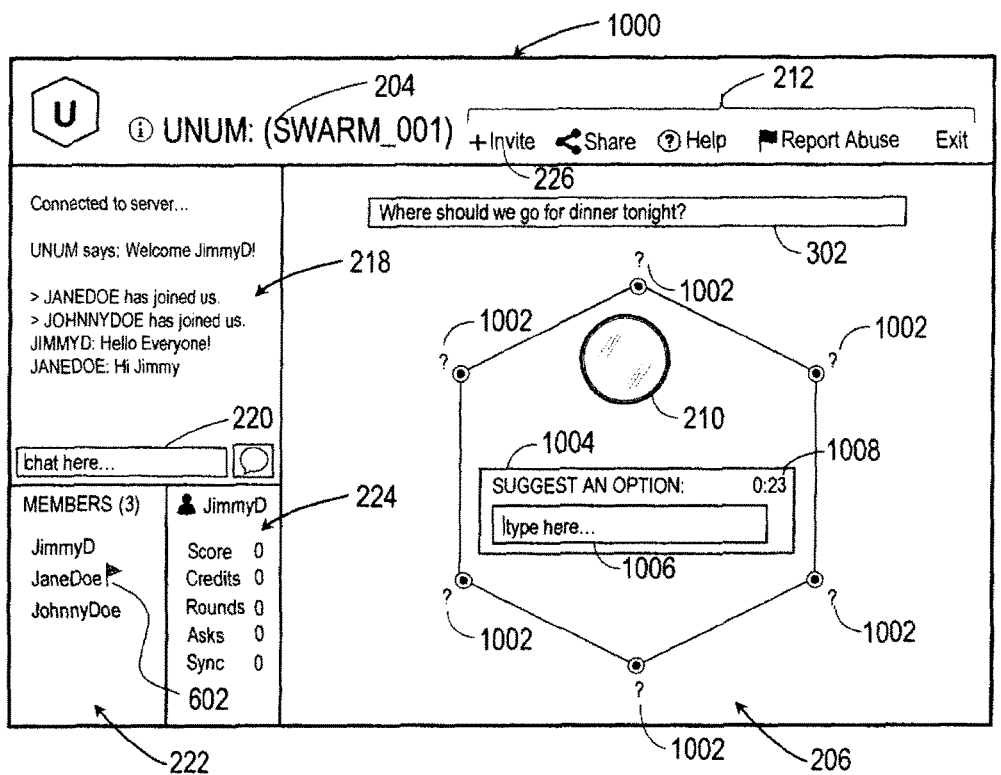
FIG. 10 is an exemplary display interface of the computing device of the collaborative system during a first point in the suggestion process.

Referring next to FIG. 10, an exemplary group display interface 1000 of one computing device 104 of the collaborative system at a point in time immediately after the first user has submitted a question in suggestion mode is shown. Shown are the group name 204, the target area 206, the communication menu 212, the chat window 218, the chat input box 220, the current member list 222, the statistics display 224, the invite button 226, the questions display 302, the flag icon 602, the plurality of input choice placeholders 1002, the suggestion dialog box 1004, the suggestion input field 1006, and the suggestion countdown timer 1008.

The exemplary display interface of FIG. 10 is shown as it might be displayed by the CIA software running on one of the group computing devices 104, in response to the question being received from the CCS 102, that question being indicated as a suggestion mode question, i.e. during the display question and suggestion mode step 906. As shown in FIG. 10, the question is displayed by the CIA software to the user of this computing device 104, in the question display 302. As also shown in the FIG. 10, the suggestion dialog box 1004 is also displayed by the CIA software to the user, the suggestion dialog box 1004 including the suggestion input field 1006 for use by the user to input the suggestion. As also shown in the FIG. 10, the suggestion countdown timer 1008 is displayed to the user by the CIA software as triggered by an indication send from the CCS 102, counting down the number of seconds that are left for the group of users to provide suggestions.

As also displayed in FIG. 10, the plurality of input choice placeholders 1002 is displayed on the target area 206, the plurality of input choice placeholders 1002 that will be replaced by input choices 208 selected from the suggestions received by the CCS 102. At the moment in time represented by FIG. 10, no suggestions have yet been displayed. In other words, the CCS 102 software is currently waiting for six suggestions (or optionally five, if "bad question" is to be automatically filled in as one of the choices as will be the case in this example).

Referring next to FIG. 11, an exemplary group display interface 1100 of the computing device 104 of the collaborative system during the suggestion period is shown. Shown are the group name 204, the target area 206, the plurality of input choices 208, the pointer 210, the communication menu 212, the chat window 218, the chat input box 220, the current member list 222, the statistics display 224, the invite button 226, the question display 302, the magnet icon 306, the plurality of input choice placeholders 1002, the suggestion dialog box 1004, and the suggestion countdown timer 1008.

The time shown in the display interface 1100 shown in FIG. 11 is during the loop of steps 908 through 912, i.e. after the user input question step 902, but before the suggestion time period indicated by the suggestion countdown timer 1008 has expired, and before the set of input choice placeholders 1002 has been filled with suggestions. Thus, at this moment in time depicted by FIG. 11, more suggestions can still be entered, thus the suggestion dialog box 1004 is still displayed on the display interface.

Also shown in FIG. 11 is a snapshot of the chat window 218 at one point in time during the suggestion period. As shown in FIG. 11, the chat window 218 displays the question asked, associated with the username of the user who submitted the question using the suggestion input field 1006 shown previously in FIG. 10. As also shown, the chat window 218 lists each of the suggestions submitted so far, and also indicates the username associated with the user who submitted that suggestion.

In the example shown in FIG. 11, JimmyD asked the question, "Where should we go for dinner tonight?" in suggestion mode which was transmitted to the CCS 102, forwarded to the CIA software of each computing device 104, and displayed by the CIA software in both the chat window 218 and in the question display 302 of all the computing devices 104 in the group. The suggestion dialog box 1004 was then displayed in the target area 206 on all computing devices of the members of the group, substantially simultaneously. The users were also given a 30 second suggestion time period to make suggestions, the suggestion time period indicated by the suggestion countdown timer 1008.

A plurality of users each entered suggestions on their own computing devices 104 which were sent by the CIA software on their computing devices to the CCS 102 (the user inputs suggestion step 908) which were then sent to each of the computing devices 104 and displayed by the CIA software of each device 104 (the CCS sends suggestion step 910 and the fill target area step 912).

As shown in FIG. 11, each of the suggestions is displayed by the CIA software on the target area 206 as one input choice, each input choice taking the place of one input choice placeholder 1002. The three input choices 208 shown are "Taco Bell", "Salad Farm" and "Red Lobster". Because only three suggestions were entered thus far in this example, the other input choice placeholders 1002 continue to be display, in this example as "?" symbols.

Optionally displayed is an indication in the chat window 218 of the username of the user who submitted the suggestion. This is a configurable option, for some groups may not want to broadcast who makes suggestions, instead leaving them anonymous. This can be a setting of the group, as set in the lobby interface 800 when a group is created and/or configured. This can also be a setting of the question, when the user selects suggestion mode, indicating if suggestions will be anonymous or tagged with their username.

At this point in the multi-step process, the CCS 102 software determines if (a) the suggestion countdown timer 1008 is up, or (b) if all the target slots have been filled with suggestions, as previously described in the spots filled decision point 914 and the time period decision point 916 of FIG. 11. If so, assuming at least 2 suggestions were received, the CCS 102 software is configured to send a message to all the computing devices 104, telling them to end the suggestion period and enter the answer period of this multi-phase process. This message is sent such that all the computing devices 104 can start the answer period in a substantially simultaneous manner, as the real-time synchronous answering session requires substantial simultaneity. (Alternatively, the CCS 102 software may determine that the question is terminated due to lack of suggestions, as described previously).

This multi-step process that includes the suggestion period and the answer period is highly effective, for it allows the group to engage in the question and answer process that combines the benefits of asynchronous and synchronous interactions. For example, the group might comprise a small group of friends, allowing the group of friends to rapidly and definitively answer a question by deciding among a number of suggestions, converging upon an answer in a very short amount of time.

Because the above system and methods are so effective (and enjoyable) for users when it comes to allowing groups of friends to make rapid collaborative decisions about their daily activities, it is highly desirable for users to employ the present invention on mobile devices such as phones and tables that are kept with them during their daily business. Furthermore, when it comes to small private groups, users may wish to keep one or more groups constantly active, but hidden in the background, ready to be engaged when one member of the group poses a question to the group.

To support this need, systems and methods for "background swarming" have been developed and are disclosed herein, said system and methods operative to monitor the activity level of the users of a particular group and put that group into a "background mode" if and when the activity of the users falls below a defined threshold value (defined herein as an inactivity threshold) for more than a defined amount of time (defined herein as an inactivity time).

To further support this need, systems and methods have been developed to "wake" a group that has been put into background mode such that it returns to active status. This poses some very unique challenges because of the distributed real-time synchronous nature of groups. It's not enough to simply activate the software to "wake" the group; the members of that group need to be drawn back into participation in a coordinated manner. This is defined as "synchronized engagement" and it involved a number of innovative systems and methods.

First, to support the synchronized engagement, methods and systems for coordination alerts have been developed that enable groups to be brought together at a moment's notice by causing the output of an alert signal (sound, image, or other sensory display) that is intended to alert each member of the group that is being "awoken" through the substantially synchronized control of those users' computing devices 104. Furthermore, the synchronized engagement systems and methods include the definition of unique and inventive values including a unique and effective quorum parameter, and an engagement time, each of which can be defined and associated with a given group.

To support the coordinated disengagement and coordinated engagement of group members to a group that is selectively put into background mode and selectively awoken from that background mode, CCS 102 and CIA software routines have been developed that handle the unique challenges associated with moderating the real-time synchronous group of distributed users. More specifically, the CCS 102 and CIA software are configured to enable the group to be automatically put into the background mode based on a level of synchronous member activity falling below the predefined inactivity threshold for more than the predefined inactivity time.

When the background mode is triggered the CIA software running on the user's computing device 104 goes into the computational background (for example, by being put into an unfocused state in a multi-tasking environment) or stops running entirely by being suspended or terminated. It's important to note that the background mode is not triggered in response to one user's inactivity, but triggered based on a collective inactivity of the group. This collective inactivity is monitored by the central CCS 102 which is configured to determine when the current real-time activity among the members of the group, falls below the inactivity threshold. This determination is made by the CCS 102 software using one of a variety of inventive methods, which can be used alone or in combination.

In one embodiment, the CCS 102 software is configured to determine the level of group activity based on the change in the user intent vectors sent from CIA software running upon the computing devices 104 of the currently joined members of that group. If none of the user intent vectors are sufficiently changing (i.e. the change is less than the inactivity threshold), it means no users are substantially engaging the interface methods to influence the pointer 210. If this lack of change is detected for more than an inactivity time amount of time, the CCS software determines that synchronous real-time activity is not sufficient among the group and the present time, and the background mode is engaged. The CCS then sends a background mode indication message over the communication link to the CIA software running on the computing devices 104 of the current group. In response to that message, CIA software on those computing devices engage background mode. This is achieved by suspending, un-focusing, hiding, terminating, or minimizing the main CIA code running on that computing device 104. If the code is configured to terminate, a small vestigial program still runs on the computing device 104 and is configured to re-launch the full CIA code in response to receiving a "wake up" message from the CCS 102. Such a "wake up" message is sent by the CCS 102 to the CIA software running on each computing device 104 in response to a desired re-engagement of the group, to be described later in this document.

In one embodiment, software running on the CCS 102 tracks the motion of the graphical pointer 210 that's under collaborative control by the group. If the collaboratively controlled pointer 210 substantially stops changing its position for more than the inactivity time, the CCS software determines that the group is not substantially active and that the background mode should be engaged, sending the background indication message over the exchanges of data 106 to the CIA software running on the computing device 104 of each of the currently joined members of that group. In response to the background indication message, the CIA software on each of the plurality of computing devices 104 then un-focuses, hides, suspends, minimizes, or terminates the main CIA code running on that computing device 104 (for that particular group). If the code terminates, the small vestigial program is configured to run on the computing device 104 such that will re-launch the CIA code (for that group) in response to the "wake up" message from the CCS 102.

Another inventive method, to be used alone or in combination with the methods described above, is configured such that the CCS 102 software monitors question input and optionally chat input from the plurality of current real-time users in the group. If no new question is received by the CCS 102 from members of that group (and optionally no new chat messages are received by the CCS 102 from members of that group) for more than the inactivity time, the CCS 102 software deems that the background mode should be engaged and sends the background indication message to the CIA software running on each of the computing devices 104 of that group. The CIA software on each of the plurality of computing devices then un-focuses, hides, suspends, minimizes, or terminates the main CIA code running on that computing device (for that group). If the main CIA code terminates, the small background program still runs that can re-launch the main CIA code and engage that group in response to the "wake up" message from the CCS 102 (for that group).

The present invention also includes novel methods and systems for "waking up" the synchronous real-time group that has been put into background mode such that the members of the group are enabled through computer-moderated methods to rapidly re-engage the system, thus restoring their real-time synchronous stance with respect to each other. Re-engagement is overseen by software running on the CCS 102 system, said software configured to determine if the group in background mode should be re-engaged (i.e. woken up) and in response, send out the substantially simultaneous "wake-up" message over the communication link to each of the computing devices 104 of the users who are currently joined members of that group.

In preferred embodiments of the present invention, when the local CIA running on the computing device 104 determines that the wake-up message was received from the CCS 102 for that particular group, the CIA is configured to perform two actions: (a) the CIA re-launches or re-focuses or otherwise restores the CIA software to a more active state, and (b) the CIA will output the user alert such as a beep or ring or other sensory alert, indicating to the user of that computing device that the group is being re-engaged. Such a beep or ring other sensory alert is referred to herein as the user alert and is described in more detail later in this document.

With respect to the wake-up message sent by the CCS 102 to the computing devices, a number of novel methods have been developed to trigger the wake-up message at appropriate times. More specifically, in some preferred embodiments, such the wake-up message is triggered by the CCS when one member of the group that is currently in background mode asks a new question. This is an effective trigger, because the new question is the primary event that requires sudden attention by members of the group. In this way, users are enabled, for example, to put their computing device 104 in their pocket and not pay attention to the group for an extended period. But, when the new question is asked to the group by a member, the CCS 102 software sends the wake-up message to the CIA software running on the plurality of computing devices 104, each of which then outputs the sensory user alert to the user indicating that the new question has been received and the group must quickly re-engage to answer it. In some embodiments, the question is displayed on the screen of each of said computing devices 104 along with a re-engagement message. The user of each computing device 104 can then optionally re-engage the interface of the CIA software on their device 104, indicating that they are now ready to collaboratively answer the incoming question (or alternately ignore the user alert if they are busy).

In many preferred embodiments, when the CIA software is in background mode and the user of that device is alerted by the user alert, the CIA software is configured to determine if the alerted user is ready to be re-engaged by monitoring the display interface of the computing device 104. If the user, for example, engages the software by pressing a specific interface control, the CIA software sends an engagement message to the CCS 102, informing the CCS 102 that the user of this particular computing device 104 is engaged and thus ready to participate in the real-time group. The interface control may, for example, be a graphical button displayed on the display interface labeled "re-engage" or "ready".

In many preferred embodiments, the CCS 102 software monitors the engagement messages from the computing devices 104 in the group, and tracks how many members of the group are re-engaged in response to the wake-up message and the associated user alerts. In many preferred embodiments, the CCS 102 software is configured to wait until a sufficient percentage of the users in that group are re-engaged before starting the collaborative answer session for the question that was entered.

In some embodiments, the sufficient percentage of the group is the predefined value known as the quorum parameter, said value being associated with that particular group. The quorum parameter indicates what percentage of the currently active members of the group must be re-engaged before the answer period of the new question of a group being awoken from background mode will be enacted. The quorum parameter may be set in the lobby interface 800 as part of the group creation process. Thus when a user creates a new group, he can set what the quorum parameter should be for that group. In some instances, the creator may desire that a high percentage of participants are required for re-engagement, in other instances the creator may be satisfied with a low percentage.

Alternatively, the CIA and CCS 102 can be configured to enable the user who had asked the question to the group and thus was responsible for that group being brought out of background mode, to set the quorum parameter when asking the question. Thus, the question-asking user can indicate what percentage of the currently joined members of the group must be re-engaged before the question enters the answer period. This allows for flexibility, for the question-asking user may choose to require only a small percentage of users to be engaged with respect to his particular question, depending upon the content and intent of his question. Conversely, the question-asking user may require that a high percentage of users is re-engaged.

It should be noted that the current invention, and associated methods, can be applied when the user is a member of multiple groups, a plurality of said multiple groups being in the background at any one time. Because each wake-up message is associated with a specific group, when the question-asking user triggers the waking of one particular group by asking the question to that group, that group is selected from the plurality of groups by the CCS 102 software.

In one example, the plurality of groups are maintained by the CCS 102, each of said plurality of groups having the plurality of associated users, each of said associated users having the associated computing device 104. The computing devices 104 may be desktop computers, tablets, phones, etc. The CCS 102 may include a set of centralized software running on a cloud server, for example Amazon® Web Services or Google Cloud Platform™ or another similar platform. The lobby interface 800 is provided to enable users to select and join groups.

In one example, a first user engages the present invention on a mobile phone. The first user has already joined three groups by engaging said virtual lobby interface 800, each of said three groups being associated with a plurality of other members, each of said other members using their own computing devices 104.

At a moment in time, the CCS 102 software determines that all three groups (designated Swarm1, Swarm2, and Swarm3) have each not been active for more than the inactivity time as predefined for each group, as determined by monitoring the change in one or more of the user input vectors, pointer motion, question input, and/or chat input from users. The CCS 102 software continues to monitor input from the users of these groups, ready to wake the group and re-engage the users if a new question comes in from a user.

A second user manually accesses Swarm2 on a mobile computing device, by activating and engaging the user interface of the CIA software running on his device 104. The second user enters a new question and presses "ask". The new question is sent by the CIA software to the CCS 102, which flags the new question as an event that requires the re-engagement of Swarm2. Thus, in response to the question, the CCS 102 software sends a Swarm2 wake-up message to the CIA software running on each of the plurality of computing devices 104 of the currently joined members of Swarm2. In this example, there are currently 25 users who are actively joined members of Swarm 2.

The CIA software on each of the computing devices 104 of all 25 users, receives the Swarm 2 wake-up message from the CCS and each instance of CIA by activating at least a portion of the display interface of the CIA software of that device 104. The CIA software also responds to the received Swarm2 wake-up message by outputting a Swarm2 user alert in the form of a ring, beep or other sensory alert to the user of each Swarm2 computing device 104. The CIA software then monitors the display interface to determine if the user of that device has responded to the Swarm2 user alert by interacting with the display interface. The interaction might include pressing a graphical button marked, for example, "answer" or "join" or "ready" or "engage".

When one user of the 25 computing devices 104 associated with Swarm2 responds to the Swarm2 user alert through his display interface, the CIA software is configured to send a Swarm2 re-engagement message to the CCS 102 indicating the username (or other identifier) of that user, and further indicating that he is re-engaged.

The CCS 102 software receives the Swarm2 re-engagement message and keeps track which members of Swarm2 that are re-engaged. The CCS 102 software continues to monitor engagement for a period of time. This period of time is referred to herein as the engagement time. In some embodiments, the creator of the group can configure the engagement time as an adjustable parameter.

In the present example, the engagement time has been configured to 30 seconds. This means the CCS 102 software runs a routine that monitors the re-engagement of members of the swarm for a maximum of 30 seconds, determining if the number of engaged members reaches the quorum parameter for Swarm2. In the present example, the quorum has been set to 50%. Because Swarm2 currently has 25 users who are joined in, the CCS 102 software is waiting until at least 13 of those users are engaged, thereby exceeding the 50% threshold defined by the quorum parameter (i.e. 13/25>50%).

If the quorum parameter is not met within the engagement time period, the CCS 102 software sends a failure message to the all the computing devices of the members of the swarm, indicating that the question failed to achieve a quorum for the group and will not be actively answered. The second user who asked the question may optionally try again, in the hope that upon another asking more users will be engaged. In some embodiments, a delay time is instituted by the CCS 102 and CIA software, barring the second user from re-asking the question until the delay time is passed, for example, 5 minutes.

If the quorum parameter is met within the engagement time, the CCS 102 software sends a "question start" message to all the computing devices 104 of the members of Swarm2. The CIA software running on those devices then execute the routines associated with the question period, enabling the users to collaboratively control the graphical pointer 210 towards one of the input choices 208 associated with the question. In this way, the group of users who are associated with a group that is currently in background swarming mode, is alerted by the moderating software when that swarm is awoken, selectively becomes re-engaged by interacting with local CIA software on their device, and if a large enough number and/or percentage of said users are re-engaged, collaboratively performs a real-time synchronized control session to achieve a response to the asked question.

If additional members become re-engaged after the answer period has started, the software enables them to seamlessly join-in, at which point they can collaboratively help in answering the question. This encourages greater engagement, even among users who could not re-engage fast enough to join the swarm within the engagement time, but start participating in the swarm soon after. When an answer is reached, the answer is communicated to all users, using the methods described previously.

Once the group has become active (i.e. is no longer in background mode), additional questions can be asked and answered using the standard methods described previously. It's only if the group enters the background mode as a result of a period of inactivity that the group will need to go through this inventive wake-up method.

In some embodiments of the present invention, an engagement timer appears on the screen of each computing device, as controlled by the CIA software of that device 104, indicating to the user how much time is left for users to re-engage the group. The engagement timer is ideally a count-down timer that appears in a pop-up box shown in the display interface, with a textual indication, for example "ready to join in?", and providing a response input button.

In some embodiments of the present invention, an engagement count is displayed to users on the screen of their computing device 104 as the engagement time ticks down.

The engagement count is an indication of the number of users who have thus far re-engaged the group during the engagement time. In many embodiments the number is expressed as a ratio with respect to the total number of members eligible to engage. For example, if at a moment in time, 8 members had engaged out of the 25 members who are currently part of that group, the engagement count would be displayed as a ratio in the form of "8/25". This ratio is updated at rapid intervals so that users can monitor how many users are connecting (engaging) back with the swarm. In other embodiments a percentage is displayed.

While the suggestion mode described above enables groups of users to form a collaborative intelligence that can answer questions, make decisions, or take actions by first collecting the set of input choices 208 from members of the group, the current methods and systems are not ideal for handling suggestions provided from large groups. That's because a group comprising hundreds, thousands, or millions of users could generate a very large numbers of suggestions in a very short amount of time. While that is a powerful resource provided by the group, reflecting mass creativity on a large scale, the system and methods described thus far have no way for enabling the group, acting as a single intelligent entity, to consider a large set of suggestions. That's because the prior embodiments involve the entire group being presented with the entire set of suggestions. The problem is, any single individual, acting as a single intelligent processing unit within the collaborative synchronous group, can only view and consider a small set of suggestions in a short amount of time.

For example, if every individual user were presented with hundreds of suggested solutions to a given prompt, it would take them a long time just to read all the suggestions, even longer to consider their views upon the relative suggestions. Further, with so many suggestions considered at once in the collaborative real-time control process, it would only take a very small advantage earned by one suggestion over the others to be selected by the group. The result are answers that always have a very low synchronicity (i.e. a very low degree of conviction within the group). In other words, if the collaborative group, acting as a single intelligence, considers a large set of suggestions in a single session, the output is slow and the results are unreliable because it takes a long time for the users to consider all the suggestions, and the group does not need to achieve a strong consensus to land upon any single one of the large number of suggestions. This is problematic.

In the prior embodiments, this problem has been solved by limiting the number of suggestions that are presented to the group for a collaborative decision. In many preferred embodiments, the system limits the number of suggestions to something on the order of 5 to 8 suggestions presented at once. This is a viable solution for relatively small groups because every member of the group can quickly consider a small set of suggestions (for example, 6 suggestions) and because the collaboratively controlled pointer 210 will require a substantial consensus in order to be targeted onto any one of the small set of suggestions.

A problem remains, however, for large groups, because by limiting the number of suggestions to a small set, very few individuals from that large group get to offer suggestions to a posed prompt, the rest of the group being excluded. If the group comprised 720 individuals, for example, and only the first six responders got to offer suggestions (or 6 randomly chosen responders), the system software is excluding creative input from 714 members of the group. This is highly frustrating for users.

This is also a highly inefficient use of the collaborative creativity that has been assembled by the present invention. After all, a collaborative group that can generate large numbers of suggestions and decide among them would be more creative and thus more intelligent than a collaborative group that can only field a very small set of suggestions from its members. Thus, innovative systems and methods are needed. The present invention, provides those innovative systems and methods, empowering large groups to provide large numbers of suggestions, greatly boosting the creativity and intelligence of the group. In fact, because the group will be able to generate and consider a much larger set of suggestions than any individual user could generate and consider in a similarly short amount of time, the current innovations elevate synchronous intelligent groups to super-intelligent levels.

Consider, for example, a first large distributed group of 720 users, all of said 720 users engaging their own computing device, each of said computing devices 104 running CIA software in networked communication with the Centralized Collaboration Server 102 running the CCS 102 software. The heretofore disclosed system has the capacity to collect suggestions from all 720 individuals, or at least a substantive percentage of those individuals, thus resulting in a highly creative collaborative group.

What is needed, however, is fast and efficient system and methods by which a large group of users, such as the first large distributed group, can evaluate the large number of suggestions and converge on a single solution. The problem is, no single individual can consider and evaluate large numbers of suggestions in a rapid and real-time manner.

For example, if only half of the 720 members in the first large distributed group provided suggestions, that would comprise a suggestion set of 360 suggestions. Each user, using their own computing device 104 would need a very long time just to read all 360 suggestions, let alone compare the relative merits and pick a preferred option. What is therefore needed are inventive methods and systems that allow large numbers of suggestions not only to be collected in real-time, but also be evaluated and selected among through a real-time synchronous process.

As described herein, the inventive methods and systems involve the innovative use of subgroups working in parallel to divide the overall problem, wherein the total group is subdivided in subgroups by the inventive routines running on the CCS 102, each of the members of said subgroups performing a collaborative synchronous process in parallel with other subgroups performing similar synchronous collaborative processes. In this way, the problem of considering and evaluating the massive number of suggestions is divided among many intelligent subgroups, using the synchronous collaborative intelligence of that group to reduce the total number of suggestions by picking among a manageably sized set and then passing that solution on to a next level of subgroup processing.

Before describing the specifics of how the CCS 102, working in conjunction with CIA software running on each portable computing device 104, is operative to divide a large number of suggestions into smaller sets that are passed to subgroups, the process of forming subgroups needs to be explained.

As described in co-pending provisional patent application Ser. No. 14/708,038, filed May 8, 2015 and entitled "MULTI-GROUP METHODS AND SYSTEMS FOR REAL-TIME MULTI-TIER COLLABORATIVE INTELLIGENCE", systems and methods were disclosed that enable the CCS 102 to moderate a multi-group system in which the total group is divided into subgroups by the software running on the CCS 102. The subgroups may optionally be further arranged in the multi-tier architecture in which the subgroups are arranged into a hierarchy in which solutions are arrived at by lower level subgroups and then passed to higher subgroups, which select from among the solutions provided by the lower level subgroups.

Figure 12:
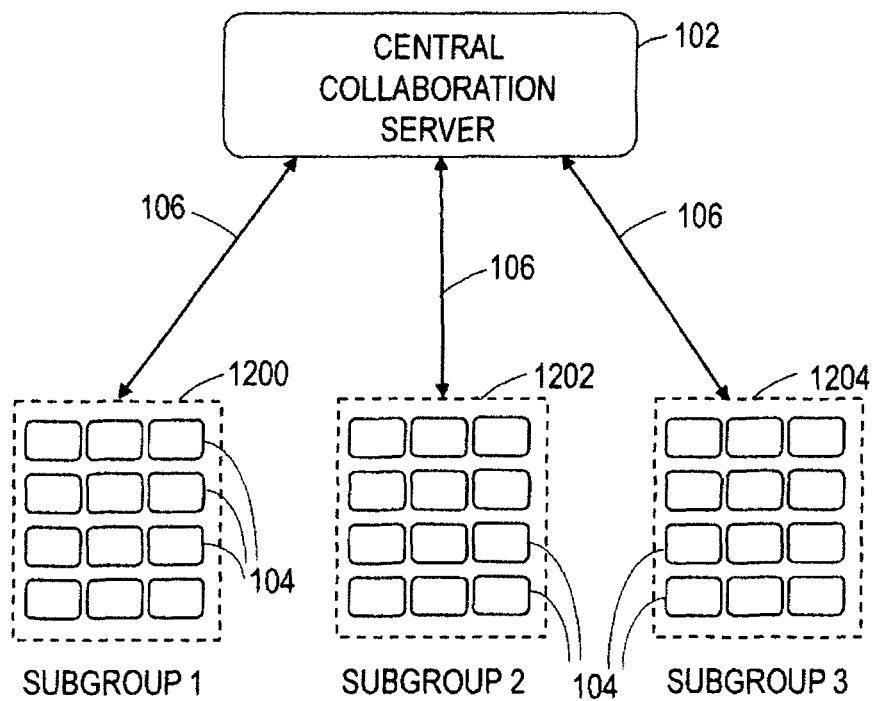
FIG. 12 is a schematic diagram of an exemplary multi-group real-time collaborative system.

Referring next to FIG. 12, one embodiment of a multi-group system is shown. Shown are the CCS 102, the plurality of computing devices 104, the plurality of exchanges of data 106, a first subgroup 1200, a second subgroup 1202, and a third subgroup 1204.

In one such embodiment, the group of users is split up into multiple subgroups, each subgroup working in parallel to answer a question or otherwise respond to a prompt. As shown in FIG. 12, the group could be split into three subgroups: the first subgroup 1200 designated "Subgroup 1", the second subgroup 1202 "Subgroup 2", and the third subgroup 1204 designated "Subgroup 3". The subgroups 1200, 1202, 1204 are moderated by the CCS 102 software to work in parallel, independently making collaborative decisions that are passed to the CCS. In the example shown, each subgroup 1200, 1202, 1204 includes 12 computing devices 104. In the example shown in FIG. 12, the parallel subgroups 1200, 1202, 1204 will pass a total of three options to the CCS 102, i.e. one per subgroup 1200, 1202, 1204. The three options will be communicated to the CCS.

When splitting the group into the fixed set of subgroups 1200, 1202, 1204, the members of the group are not contributing as efficiently as they could, for they are only participating when that subgroup is engaged in the multi-step process. This does not take advantage of the full power of the collaborative group, giving substantial idle time to many members of the total group when their subgroup is waiting for other subgroups to provide solutions to be considered. In fact, the more subgroups in the architecture, the more idle time that members of the group have. This is wasteful of the intellectual resource of the group members. Even worse, it's dull for the users, for they are waiting around for periods of time while other subgroups are engaged.

The present invention solves this with a substantial innovative leap whereby the CCS 102 dynamically creates new subgroups for each phase of the suggestion processing, said subgroups collectively including all members of the overall group. More specifically, the subgrouping is dynamic such that members of the overall group are first assigned to a first set of subgroups engaging in a first level of processing that provides a first set of answers or solutions. At that point, the group members are dynamically reassigned by the CCS 102, which creates a new set of subgroups collectively including all members of the group. In this way, all users participate in all steps of the process as a result of the CCS 102 software dynamically rearranging the collaborative groups. This means that no users having substantial idle time, which is substantially more enjoyable for users and a substantially more efficient use of intellectual resources.

Figure 13:
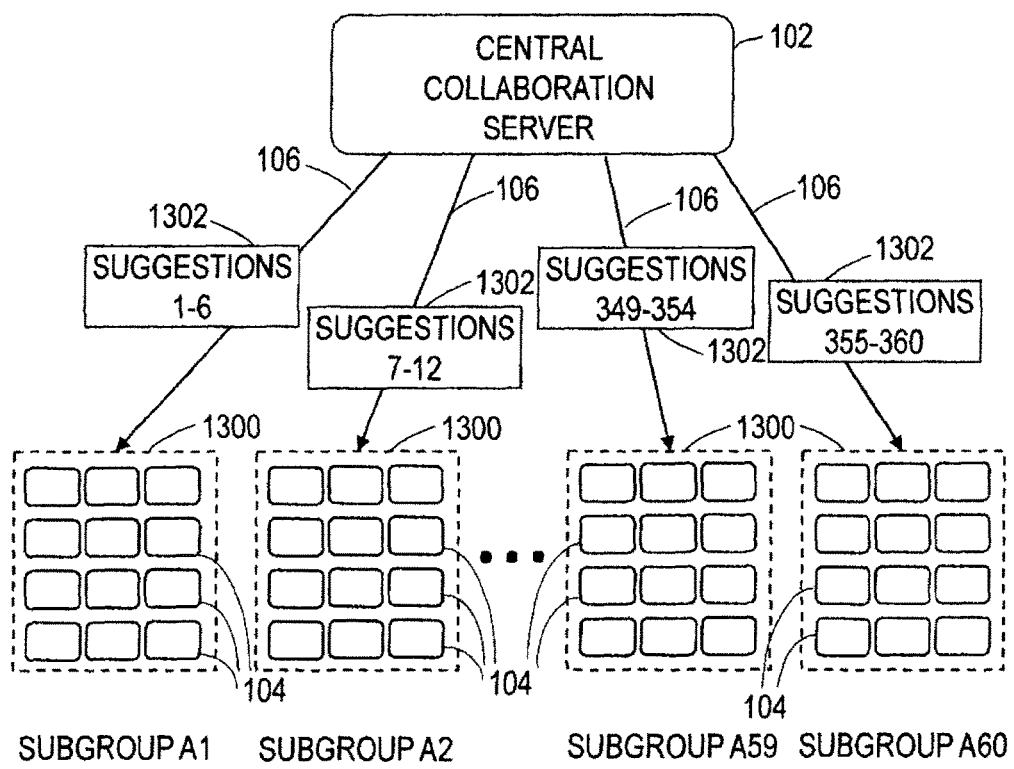
FIG. 13 is a schematic diagram of an exemplary multi-group real-time collaborative system during a first phase of the suggestion process.
Figure 14:
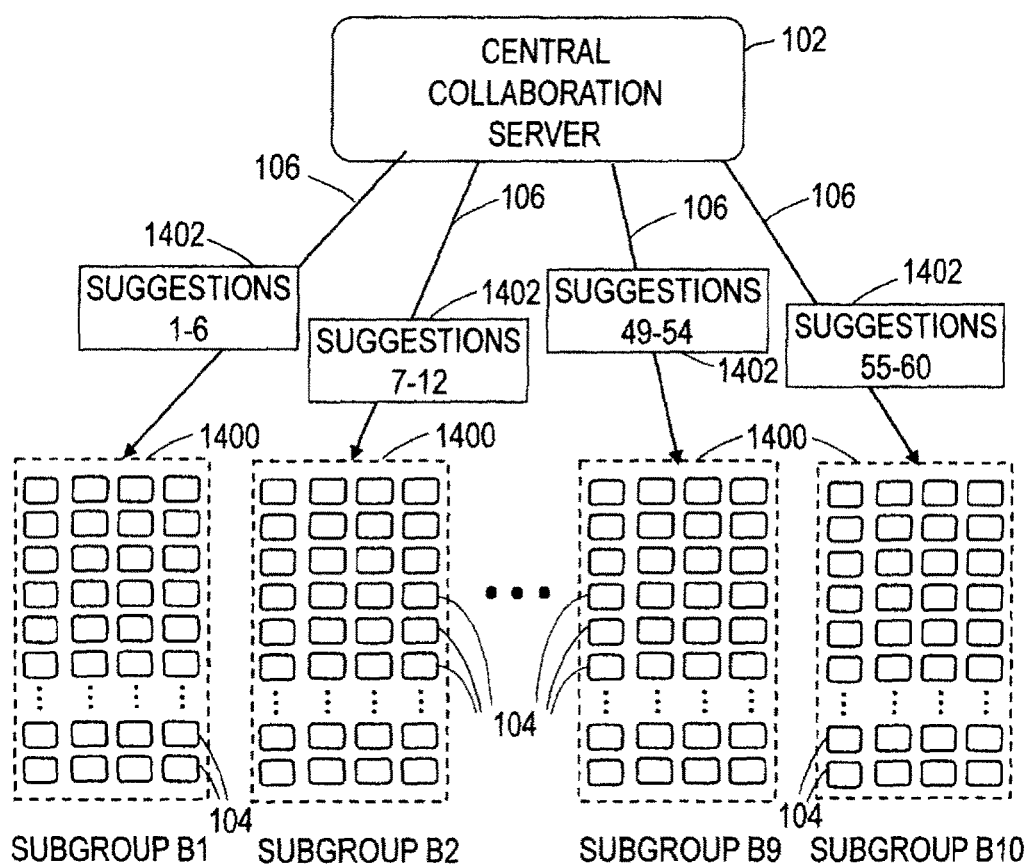
FIG. 14 is a schematic diagram of an exemplary multi-group real-time collaborative system during a second phase of the suggestion process.

Referring next to FIGS. 13 and 14, schematic diagrams of an exemplary multi-phase first subgroup arrangement and an exemplary multi-phase second subgroup arrangement for an exemplary group is shown. Shown are the CCS 102, the plurality of computing devices 104, the plurality of exchanges of data 106, a plurality of first subgroups 1300, a plurality of first suggestions subsets 1302, a plurality of phase two second subgroups 1400, and a plurality of second suggestion subsets 1402.

The exemplary collaborative group is comprised of 720 users, each of said 720 users interacting with one of said computing devices 104 in exchanging data 106 with the CCS 102. A question is posed to the group under computer moderation of the present invention, said question appearing on the display interfaces of said users through the CIA software running on each of said computing devices 104. Furthermore, the suggestion dialog box 1004 is displayed to each of said 720 users using the methods described previously, the question and suggestion boxes appearing substantially at the same time for all users, along with the suggestion countdown timer 1008 that indicates how much time the group has to provide suggestions. In this example, the suggestion countdown timer 1008 provides the group with 30 seconds to provide suggestions.

As the suggestion countdown timer 1008 counts down, a large number of said users provide suggestions by entering them into the suggestion dialog box 1004 of the display interface of their computing device 104. The CIA software running on each computing device 104 communicates the suggestion to the CCS 102. The CCS 102 collects all the suggestions in memory, keeping a running list of the number of suggestions. The collection process ends when either (a) the suggestion countdown timer 1008 runs out, or (b) when a desired number of suggestions is collected. In this way, a very large set of suggestions is collected by the CCS 102 during the real-time 30 second period. The CCS 102 keeps a count of the number of suggestions received and determines if a sufficient number of suggestions are received during the allotted time. In this particular example, the CCS 102 is configured to assess if at least 50% of the 720 users provide suggestions during the allotted period. In this example, exactly 50% of the users, or 360 users, provide suggestions, thus satisfying the requirement. 50% is an effective size because (a) it assures that a large portion of the total user base has participated, and (b) it allows users not to participate if they simply don't have a suggestion to give. In general, a desired number of suggestions is configured in the CCS 102 software to be somewhere between 20% and 70% of the total group size.

In this example, the CCS 102 software waits until 50% is reached, which corresponds to an initial suggestion set of 360 suggestions provided by the example group of 720 members. The CCS 102 is then operative to begin the computer moderated evaluation and decision process by defining the plurality of first subgroups 1300, each of said first subgroups 1300 populated with a designated number of members of the total group, each of said first subgroups 1300 tasked with selecting from among one of the plurality of first suggestion subsets 1302 of the full initial suggestion set collected. To do this, the CCS 102 software spawns a plurality of virtual sub-servers, each of said virtual sub-servers to be in communication with the computing devices 104 of the members of each defined subgroup.

If, for example, the total group has 720 users and the total number of suggestions received by the CCS 102 from those users is a set of 360 suggestions, and if the CCS 102 has been configured to present synchronous collaborative questions with 6 input choices 208 to choose among, as shown in the example input choice set of FIGS. 16-19, the CCS 102 splits the set of 360 suggestions into 60 first suggestion subsets 1302, each of said first subsets 1302 comprising 6 suggestions. In other words, the CCS 102 is configured to divide the total number of suggestions by the number of input choices 208 to be displayed on the collaborative interface of each users, thereby calculating the number of first subgroups 1300 needed to process all 360 suggestions in parallel:

> Number of first subgroups=(Total number of suggestions)/(number of input choices shown on the display interface)

Thus, in the present example, the CCS 102 software computes that 60 first subgroups 1300 are needed as a result of dividing the 360 suggestions collected by the 6 input choices 208 that will be presented on each CIA display. Each first subgroup 1300 will include 720 group members/60 subgroups=12 members per first subgroup 1300, as illustrated in FIG. 13. A first subgroup 1300, designated A1, selects a first target from the suggestion subset 1302 consisting of suggestions 1-6. A second first subgroup 1300, designated A2, selects a second target from the suggestion subset 1302 consisting of suggestions 7-12, and so on, through 60th subgroup A60 1300 and the suggestion subset 1302 consisting of suggestions 355-360.

In the event that the number of suggestions is not evenly divisible by the number of input choices 208 on the CIA display, one or more first subgroups 1300 of the total number of subgroups can be presented with less than a full set of input choices 208. For example, if 359 suggestions were collected, 60 first subgroups 1300 would be defined by the CCS 102, with 59 of those first subgroups 1300 being assigned a full set of 6 input choices 208, and one first subgroup 1300 being defined a partial set of 5 input choices 208. Alternatively, a duplicate suggestion could be used to fill the last input choice 208 of the last first subgroup 1300. This is generally avoided because it could give an unintentional bias to that suggestion.

It should be noted that there may be natural duplicates of many of the suggestions resulting from the fact that some members of the group of users may have provided similar suggestions. This is generally not a problem, for the bias washes across multiple phases. That said, some embodiments of the CCS 102 software can be configured to check for and eliminate substantially duplicate suggestions.

Whether duplicates are eliminated or not, the CCS 102 software is configured to divide the total group of users into the large number of first subgroups 1300, each of which are assigned the small suggestion subset 1302 of the total suggestion set. These first subgroups 1300, as enabled by the CIA software running on the computing device 104 of each member of that first subgroup 1300, are tasked with evaluating and selecting from among the provided input choices 208. Each first subgroup 1300 then sends the resulting target to the CCS 102, which becomes part of a second suggestion set. In the exemplary system of FIGS. 13 and 14, the 60 first subgroups 1300 have each selected the target, resulting in the second suggestion list of 60 suggestions. The process then repeats, wherein the total group is divided up again by the CCS 102, but now with larger subgroups, for the total number of suggestions has been reduced. As a result, the CCS 102 recombines the phase one first subgroups 1300 into the new set of the plurality of phase two second subgroups 1400, each of the phase two second subgroups 1400 being a factor of six larger than the first subgroup sizes used in phase one. The resulting phase two second subgroup arrangement is shown in FIG. 14. In this way, the phase two second subgroups 1400 have a harder task, selecting among a stronger set of suggestions, but the phase two second subgroups 1400 also have more collaborative "brainpower"—for they each have six times the number of participants than the phase one round. The same is true as the system proceeds to further phases, reducing the number of suggestions and tasking larger subgroups to choose among at each phase in the multi-phase process. This is a highly effective methodology, resulting in a very fast and efficient means of collaborative creativity and collaborative decision making.

As shown in FIG. 14, the phase two second subgroups 1400 comprise 10 second subgroups 1400, each including 72 members: subgroup B1, subgroup B2, etc., through subgroup B10. Each phase two second subgroup 1400 selects the target from one of the plurality of second suggestion subset 1402 consisting of 6 suggestions from the phase two suggestion list. As shown in FIG. 14, subgroup B1 1400 selects from the second suggestion subset 1402 consisting of suggestions 1-6, subgroup B2 from second suggestion subset 1402 consisting of suggestions 7-12, etc. The selected targets are then formed into a third suggestion list by the CCS 102, comprising 10 suggestions of the original suggestions list.

Thus, the present invention enables the formation and moderation of large-scale collaborative groups and enables those groups to answer questions (or otherwise respond to prompts) as a single intelligent entity, the single intelligent entity able to collect massive numbers of suggestions from networked participants in real-time and then evaluate those suggestions through the use of massively-parallel collaborative synchronous, real-time groups, until a single solution emerges from the group that reflects the collaborative will of the entire group. Because of the efficiencies of parallel processing, the final solution can emerge in a time that's far shorter than any single individual in the group could have even read and considered all the suggestions. The result is a super-intelligence that exceeds the creative ability and decision-making ability of any single member of the group.

Figure 15:
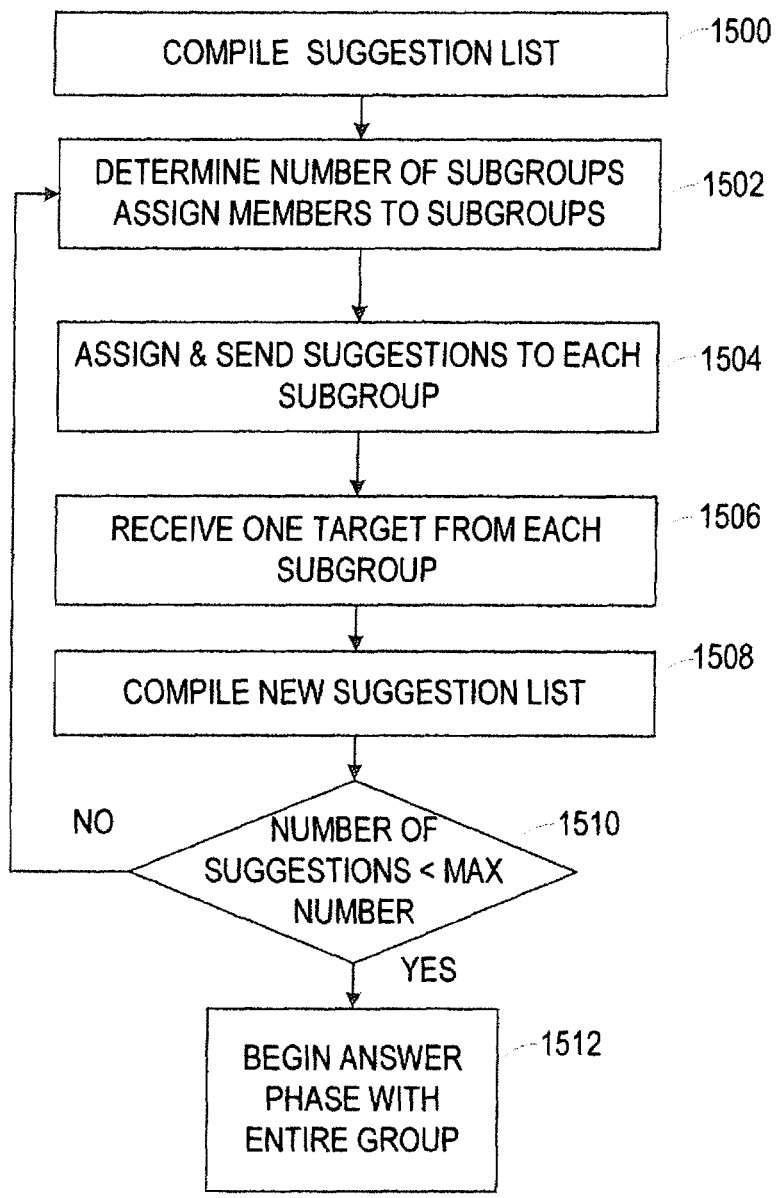
FIG. 15 a flowchart diagram of a multi-group, multi-phase collaboration process.

Referring next to FIG. 15, a method for the multi-phase collaboration process is shown. Shown are a compile suggestion list step 1500, a determine number of subgroups step 1502, an assign/send suggestions step 1504, a select one target step 1506, a new suggestion list step 1508, a number of suggestions decision point 1510, and a begin answer period step 1512.

The present invention can be described in term of the step-by-step methods by which the group of users can be enabled, under computer moderated control of the CCS 102, to form the massively parallel collaborative intelligence that can provide large numbers of creative suggestions and then select among those large numbers of suggestions in a very short amount of time.

Prior to the multi-phase process, the collaborative system is assembled and enabled as described in the co-pending applications: The plurality of computing devices 104 are connected to the central collaboration server 102, said plurality of computing devices 104 running the local CIA software that communicates real-time bidirectional data 106 with the centralized server 102 running CCS 102 routines. The CIA software enables the display of the prompt to the user of that device, said prompt sent from the CCS 102 to all said computing devices 104 at substantially the same time, enabling the real-time synchronous response. The real-time prompt received from the CCS 102 and displayed by the CIA software may be a question, decision, notion, or action to be decided upon by the group through the real-time synchronous collaborative process. In many embodiments, the prompt may be posed by a member of the group. In some embodiments, the prompt may be crafted by the group itself.

In some embodiments, the prompt may come from another group, enabling to artificial collaborative intelligences to communicate/debate.

The suggestion mode process is then started as previously described. In the multi-phase process, large number of suggestions are provided by large numbers of users through the substantially simultaneous display of the prompt to each of said users on the plurality of computing devices 104.

In the first step of the multi-phase process, the compile suggestion list step 1500, the CCS 102 compiles a first suggestion list comprised of all suggestions received from the plurality of computing devices 104 during the suggestion period.

In the next determine number of subgroups step 1502, the number of subgroups is determined based on a number of suggestions, and a number of input choices 208 shown on the target area 206 of the display interfaces. As previously described, the number of subgroups=(Total number of suggestions)/(number of input choices). Each group members is then assigned to one subgroup, such that each subgroup has equal, or close to equal, numbers of members.

In the next assign/send suggestions step 1504, the CCS 102 assigns a unique suggestion subset to each subgroup. The number of suggestions in each suggestion subset is equal to the number of input choices 208 available for selection on the target area 206 of the display interface. Each suggestion subset is then sent to the computing devices 104 of the associated subgroup.

Next, in the select one target step 1506, each subgroup completes the collaborative answer session as previously described in the co-pending applications, resulting in the subgroup collaboratively selecting one target from the suggestion subset.

In the next new suggestion list step 1508, the CCS 102 compiles each target receives from each subgroup into a new, updated suggestion list, where the number of suggestions is now equal to the number of subgroups. The process then proceeds to the number of suggestions decision point 1510.

In the number of suggestions decision point 1510, if the number of suggestions is within an allowed range of input choices that the target area 206 is configured to display, i.e. less than a maximum number of input choices, the process proceeds to the begin answer period step 1512.

In the begin answer period step 1512, the subgroups are recombined into one single group, and each suggestion is displayed on the target area 206 as one input choice 208. The answer period then proceeds as described in previous applications, with the group collaboratively selecting the target from the input choices 208.

If the number of suggestions in the new suggestion list is greater than the maximum number of input choices, the process returns to the determine number of subgroups step 1502, where the CCS 102 reconfigures the members into new subgroups using the revised (smaller) suggestion list, and the process proceeds through as many subgroup iterations as required until the number of suggestions is less than the maximum number, and then proceeds to the begin answer period step 1512.

This method enables through the coordinated interaction of the CCS 102 and the large number of computing devices 104, each running CIA software, the large numbers of users to collaboratively consider the set of refined suggestions in the computer-moderated parallel process in which the total group of users (i.e. the full group) is dynamically re-grouped again into subgroups which evaluate one subset of the set of refined suggestions in parallel, each of said smaller subgroups producing a selected highly-refined suggestion from their designated subset of refined-suggestions. This results in the large set of initial suggestions being parallel-processed into the smaller set of refined suggestions, the smaller set of refined-suggestions then being parallel-processed by newly defined subgroups into the even smaller set of highly-refined suggestions. This process referred to herein as "regrouping and refining".

In coordinating the regrouping and refining process, the CCS 102 combines subgroups into larger groups as the process proceeds, phase after phase. More specifically, at each phase in the process the CCS 102 is configured to divide the total number of suggestions in the currently active suggestion set by the total number of input choices 208 to be displayed by the CIA software to each user, thereby calculating the number of subgroups needed to process the current set of suggestions in parallel. If the CIA software is configured to display the set of 6 input choices 208 to the user during the given collaborative selection round, the number of suggestions left after each subsequent phase of refinement will be ⅙ the number of prior suggestions. Thus the CCS 102 software is configured to combine groups such that they are 6 times larger in each subsequent phase.

The "regrouping and refining" process may be repeated as many times as necessary to reduce the initial set of suggestions down to a final set of suggestions that is small enough that it can be considered by the entire group in a single collaborative session of synchronous decision-making. In many preferred embodiments, the small enough set is defined as a number of suggestions between 2 and 12, for such a set size can be considered by a single user in a short amount of time. In one preferred embodiment, the set of 6 suggestions/input choices 208 is chosen as the ideal size for the final suggestion set. Thus, the initial set of suggestions (which could have started out in the thousands) is processed under computer mediated control by subgroups working in parallel, each of said subgroups considering subsets of the initial suggestion set to produce the smaller refined suggestion set, this process being repeated iteratively until the small final set of suggestions is produced.

Thus the final set of suggestions is considered by the entire group in the collaborative real-time decision-making process such that the group works as the synchronous collaborative unit to select one solution from said final set of suggestions, said one solution being the group's chosen answer to the prompt that kicked off the process. This answer is determined by the CCS 102 software and communicated to all the computing devices 104 for display by the CIA software to the users of those devices. In this way, all users who participated in the group are informed as to answer that was chosen by the collaborative will of the group.

The aforementioned process is very powerful, enabling the large group of networked users (i.e. group) to form the real-time collaborative intelligence that can think creatively and make decisions in an extremely fast manner. More specifically, the present invention allows the large group of networked users to receive the question (or other similar prompt) on their personal computing devices 104 and to collectively provide the large number of real-time suggestions in response to said question (or other similar prompt). The present invention further allows the large group of networked users to collaboratively consider and evaluate said large set of suggestions, narrowing the large set of suggestions to a manageable set of solutions through the computer-mediated process that divides the large group of users into the plurality of subgroups, each of said subgroups enabled to consider one subset of the large set of suggestions in parallel. The present invention further enables the iterative process of FIG. 15 in which said set large set of suggestions is repeatedly narrowed to smaller and smaller sets through subsequent regrouping of the large group of users, each subsequent regrouping enabling a larger set of users to consider a smaller set of highly refined solutions. The present invention further enables said iterative process to culminate when a manageable set of final suggestions is reached, said manageable set comprising few enough suggestions that individuals can rapidly consider and compare them. The present invention further provides the final selection process in which the full group of users is enabled to collaboratively select the final solution from the final set of suggestions using the real-time synchronous control process, said collaborative selection resulting in the final answer. The present invention thereby employs the inventive computer-mediated parallel-processing methodology to enable a highly efficient collaborative intelligence using dynamically defined subgroups that are reconfigured during the selection process.

In the example illustrated in FIGS. 13 and 14, the first set of 360 suggestions from the group including 720 members is received by the CCS 102 during the allotted time. The CCS 102 groups these suggestions into 60 first suggestion subsets 1302 of 6 input choices 208. To evaluate these 60 first suggestion subsets 1302, the CCS 102 also divides the group of 720 users into 60 first subgroups of 12 users each. Each of said first subgroups of 12 users is treated by the CCS 102 as its own mini-group. More specifically, the CCS 102 sends the computing devices 104 of the member of each first subgroup, one of the 60 first suggestion subsets 1302 of 6 suggestions, each of said first subgroups tasked with the real-time synchronous decision process of evaluating their assigned first suggestion subset 1302 of 6 suggestions and collaboratively choosing the single best suggestion as the target using the collaborative process. In this example, each first subgroup 1300 is given 20 seconds to make that decision, using the innovative computer-moderated real-time collaborative control methods described herein. Thus at the end of these 20 seconds, each of said 60 first subgroups of 12 users produces the target as a preferred solution from among their first suggestion subset 1302 of six solutions.

This results in the refined second suggestion set of 60 suggestions. In this way, the massively parallel process allows the group to consider 360 suggestions and narrow it down to 60 refined suggestions in only 20 seconds.

The CCS 102 processes the set of 60 refined suggestions and breaks the second suggestion set up into new second suggestion subsets 1402, each of said second suggestion subsets 1402 again comprising 6 input choices 208. More specifically, the CCS 102 breaks up the set of 60 refined solutions into 10 subsets of 6 refined solutions. To evaluate these 10 second suggestion subsets 1402, the CCS 102 then divides the group of 720 users into 10 second subgroups 1400 of 72 users. Each of said second subgroups 1400 of 72 users is treated by the CCS 102 as its own mini-group. More specifically, the CCS 102 sends the computing devices 104 of the member of each second subgroup 1400, one of the 10 second suggestion subsets 1402 of 6 suggestions, each of said second subgroups 1400 tasked with the real-time synchronous decision process of evaluating their assigned second suggestion subset 1402 of 6 suggestions and collaboratively choosing a single best suggestion as the target. In this example, each second subgroup 1400 is given 20 seconds to make that decision, using the innovative computer-moderated real-time collaborative control methods described herein. Thus at the end of these 20 seconds, each of said 10 second subgroups 1400 of 72 users, produces the preferred solution from among their second suggestion subset 1402 of six solutions. The result of this iteration of the inventive process is a third set of 10 highly-refined-suggestions, generated by the 10 second subgroups 1400 of 72 users working in parallel.

Thus, after only 60 seconds has passed since the question was first posed to the group, the current invention has enabled the collection of 360 proposed solutions from the group of 720 users and has enabled the 720 users to collaborate in parallel first subgroups 1300 to refine that set of 360 solutions to a preferred second set of 60 refined solutions, then further refined the second set of 60 solutions to a third set of 10 highly refined solutions.

The present invention could be configured to repeat the process, splitting the 720 member group into two third groups, each of which considers a third suggestion subset of 5 highly-refined solutions, or the present invention could skip that step and present all 10 of the highly refined solutions to the entire group for final consideration.

Because the second suggestion set of highly refined solutions is small enough (10 suggestions) that any single user could viably consider the full suggestion set in a very short amount of time, the software is configured to choose the latter option in this particular example case. Thus, the CCS 102 software is configured to now engage the full group in the final collaborative decision process in which all group members are simultaneously presented with the 10 highly refined solutions and tasked to use the collaborative control methods disclosed herein to collectively choose one of the 10 solutions in 20 seconds or less. Under computer moderated control, the group of 720 users converges upon the target, which is then presented as the final solution to all members of the group. The solution is also stored, logged, and optionally Tweeted® for the world to peruse under computer moderated methods, as disclosed in co-pending patent applications.

Thus, after only 80 seconds, the current invention has enabled posing the question to the group of 720 users working in the collaborative group, collected 360 possible solutions, refined that set of 360 possible solutions to the preferred subset of 60 refined solutions through a massively parallel process, then further refined the set of 60 solutions to the set of 10 highly refined solutions through another parallel process, then selected the final solution from that set of 10 highly refined solutions using the real-time synchronous collaborative process. The end result is the computer moderated collaborative intelligence that is extremely powerful, for it collaboratively considered the posed prompt (i.e. question), collected 360 ideas which comprises the highly creative intelligence, then considered all 360 solutions and selected one, all in 80 seconds, resulting in a highly discriminating intelligence.

Furthermore, the present invention can be scaled up to support any size group, so long as sufficient computing power is provided, the larger the group the more intelligent the resulting system 100. For example, if the group were comprised of 100,000 users all networked to the CCS 102 using the methods and systems disclosed herein, the question could be posed to all 100,000 in a substantially simultaneous manner, being displayed to all users by the CIA software running on their personal computing devices 104. That question could be, for example, "How do we solve world peace?", or, "How to we end the Ebola crisis?"

If the CCS 102 is configured to accept the suggestion set that is 50% of the size of the total number of users, it means the CCS 102 could quickly collect 50,000 suggestions in parallel, said suggestions then being carefully considered by computer moderated subgroups in a series of phases.

In only 20 seconds, 50,000 suggestions would be collected. After another 20 seconds, those suggestions would be refined down to 8334 suggestions through the inventive massively parallel process. After another 20 seconds, those refined suggestions would be refined further to a set of 1382 suggestions through the inventive massively parallel process. After another 20 seconds, those refined suggestions would be further refined to a set of 231 through the inventive massively parallel process. After another 20 seconds, those refined suggestions would be further refined to a set of 39 through the inventive massively parallel process. After another 20 seconds, those refined suggestions would be further refined to a set of 7 through the inventive massively parallel process. After another 20 seconds, the final solution would be chosen by the entire group, resulting in a final solution to the posed prompt.

Figure 16:
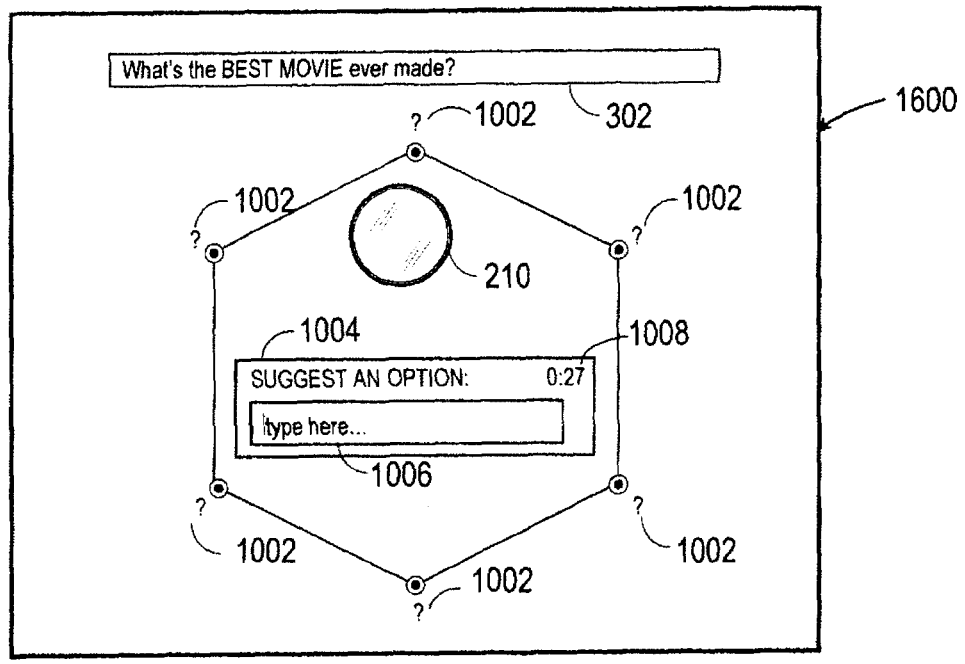
FIG. 16 is an exemplary display interface of the computing device during a suggestion period of a multi-group, multi-phase collaboration process.
Figure 17:
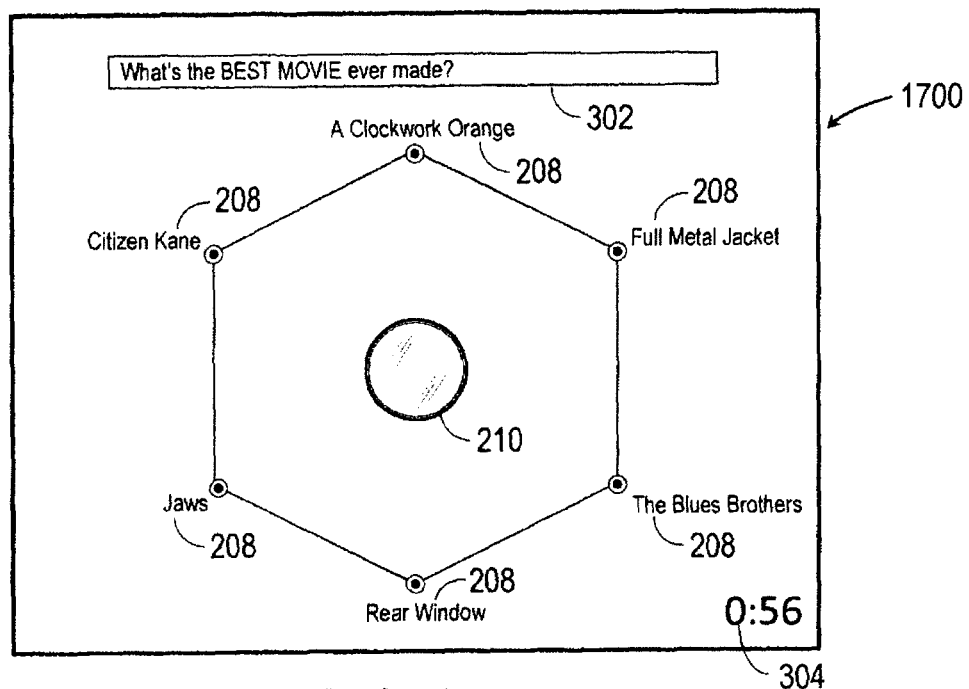
FIG. 17 is an exemplary display interface of the computing device at a first point during a first phase of a multi-group, multi-phase collaboration process.
Figure 18:
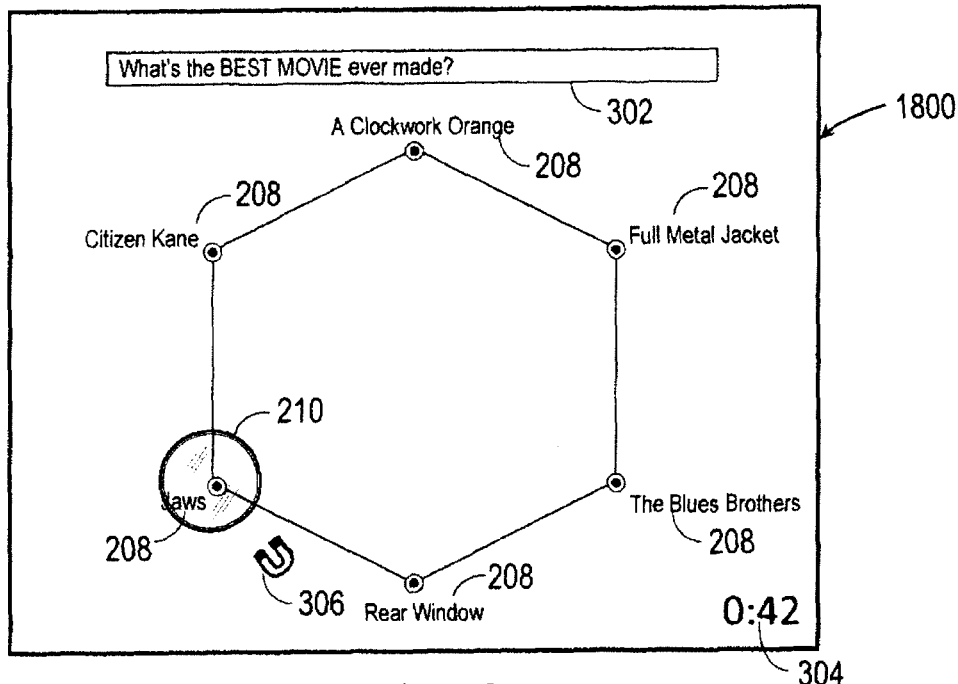
FIG. 18 is an exemplary display interface of the computing device at a second point during the first phase of a multi-group, multi-phase collaboration process.
Figure 19:
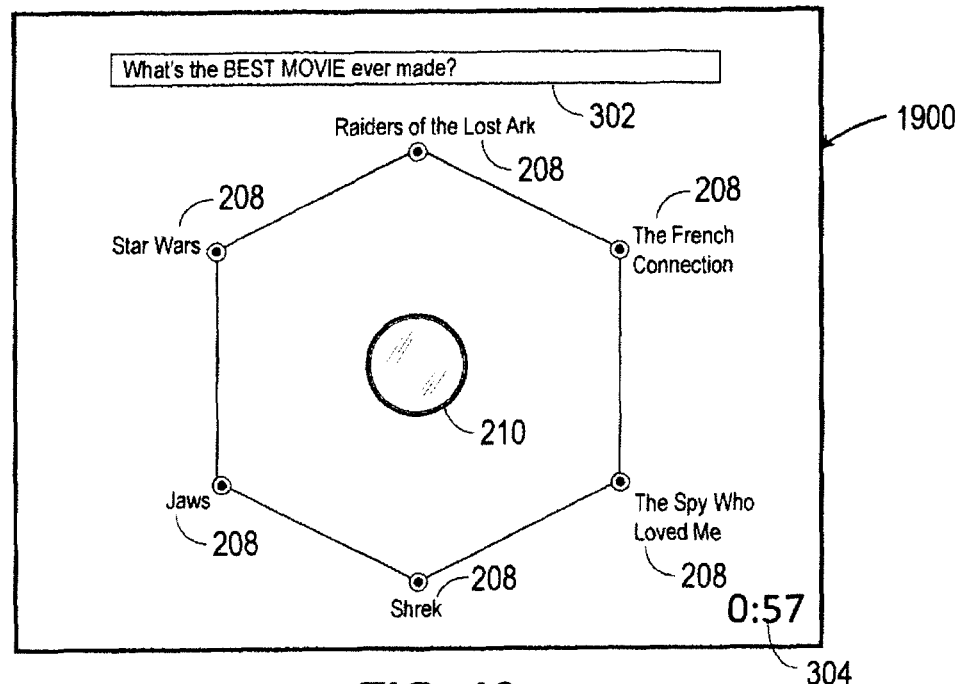
FIG. 19 is an exemplary display interface of the computing device during a second phase of a multi-group, multi-phase collaboration process.

In other words, the present invention enables a massive group of users to engage in a massively parallel, multi-stage, collaborative decision making process that enables them to: (a) consider the simultaneously presented prompt that conveys a question or decision to be solved by the group, (b) collaboratively generate a huge number of suggested solutions in response to the prompt in a very short amount of time (for example 50,000 suggested answers generated in 20 seconds the example above), (c) refine that massive set of suggestions down to a carefully considered final answer by splitting the total set of suggestions into the plurality of subsets, each of said subsets considered by one subgroup of the total group, said subgroups working in parallel to select preferred solutions using collaborative synchronous decision methods described herein, (d) iterating the process such that each time a refined set of solutions is produced by the set of parallel subgroups, a newly defined set of larger subgroups considers the set of refined solutions in parallel, (e) culminating the iterative process when the single manageably sized set of highly refined solutions is produced, (f) having the full group collaboratively select the single preferred solution from the single manageably sized set of solutions. Because of the massively parallel nature of the present invention, said single preferred solution is generated very quickly from the very large set of suggested solutions, (e.g. the 50,000 suggestions of the example above is refined down to a single preferred solution in only 2 minutes and 20 seconds.) Referring next to FIGS. 16-19 exemplary target areas of display interfaces are shown during an exemplary multi-group multi-phase process. FIG. 16 is an exemplary target area 1600 of one computing device 104 during the suggestion period of the multi-group, multi-phase collaboration process. FIG. 17 is an exemplary target area 1700 of the computing device 104 at a first point during the first phase of the multi-group, multi-phase collaboration process. FIG. 18 is an exemplary target area 1800 of the computing device 104 at a second point during the first phase of a multi-group, multi-phase collaboration process. FIG. 19 is an exemplary target area 1900 of the computing device 104 during the second phase of the multi-group, multi-phase collaboration process. Also shown are the plurality of input choices 208, the pointer 210, the question display 302, the countdown clock 304, the magnet icon 306, the plurality of input choice placeholders 1002, the suggestion dialog box 1004, and the suggestion countdown timer 1008.

To support the creation of the computer-moderated collaborative intelligence system 100 across large numbers of networked users employing the massively parallel process described above, additional inventive methods are disclosed herein that improve the user experience. More specifically, inventive display methods have been developed for ensuring that each user has a seamless and engaging experience during the period of real-time massively parallel synchronous swarming.

In many preferred embodiments, users are shuttled through the multi-phase process by the moderating software running on the CCS 102, the process involving numerous phases with users assigned by the CCS 102 to subgroups that change from phase to phase, but from the perspective of each individual user interacting with the local CIA software displayed on his own computing device 104, the environment remains consistent such that the user has little indication (if any) that the user is being re-assigned to different subgroups across each phase of the multi-phase process. From the perspective of each user, the overall environment doesn't change, the playing field appearing consistent, only the set of input choices 208 being updated as that user progresses from phase to phase in the multi-phase process.

More specifically, the single user of the single computing device 104 connected to the central CCS 102 by communication link will experience having the prompt appear on his display interface when the question or decision is put before the entire group, said prompt indicating the question or decision the group is being asked to solve. This, for example, could be a text prompt describing an open ended question such as, "What happened to the missing Malaysian airliner that has never been found?" Or, for example, it could be a highly subjective question that has so many possibilities, it would never be suitable for a poll or other asynchronous process. For example, "What's the best movie ever made?"

In the example shown in FIGS. 16-19, the large group of users is engaged with the inventive system 100, each using the computing device 104 running CIA software in communication over a network to a central CCS 102. One of said users enters the question, or the CCS 102 generates the question automatically, such that the question appears in the question display upon all the display interfaces of all users in a substantially simultaneous manner. Also displayed by the CIA software running on each computing device 104 is the suggestion dialog box 1004 as previously described, asking the user for a suggested answer to the prompt. The exemplary target area 1600 at this stage is shown in FIG. 16, with the prompt "What's the BEST MOVE ever made?" included in the question display 302, and the suggestion dialog box 1004 (including the suggestion input field 1006 and the suggestion countdown timer 1008) displayed in the target area 1600. Instead of input choices 208 displayed on the target area 1600, the plurality of input choice placeholders 1002 (each indicated by the "?" character) are shown arranged on the target area 1600, approximately equidistant from each other.

In response to the prompt shown in the question display 302, the single user of the single computing device 104 will provide one suggestion by entering it into the suggestion dialog box 1004, using methods described previously. The CCS 102 will receive this suggestion along with suggestions from a large number of other users. For a large group of 100,000 users, the number of suggestions could be massive, for example 50,000 suggestions collected during the short suggestion period. This said, the innovative user interface methodology of the present invention makes it possible for the single user not to be overwhelmed or even aware of the massive set of suggestions provided by others in the large group. That's because the CCS 102 immediately splits the massive set of suggestions into the large number of suggestion subsets, each of said subsets a manageable size for individual users. Thus what appears on each individual user's computing device 104, as moderated by the central CCS 102, is the small subset of input choices 208 to choose between.

FIG. 17 shows the target area 1700 with the input choice placeholders 1002 replaced by input choices 208 from one suggestion subset of the initial suggestion list. In this example, the single user has been assigned to one subgroup with 11 other users by the CCS 102 (as previously shown in FIG. 13). The CCS 102 coordinates the routing of each of the 12 users to the same subgroup by launching the subserver that connects these users into the subgroup using the methods described previously. In this way, the subgroup is enabled to work in synchrony under time pressure to select one of the input choices 208 presented to them in the subset of selections. The input choices 208 presented to the exemplary subgroup are: "A Clockwork Orange", "Citizen Kane", "Jaws", "Rear Window", "The Blues Brothers", and "Full Metal Jacket".

At the same time, many other subgroups are working in parallel, each being displayed a different suggestion subset of input choices 208 from the full set of suggestions provided. Thus the single user in this example need not be concerned about the specific users who are part of his subgroup, or even know how many other users are part of that subgroup. All the user needs to focus on is helping to guide the graphical pointer 210 to one of the input choices 208 in the suggestion subset displayed by the CIA software running on his computing device 104, the graphical pointer 210 moving under the real-time synchronous collaborative control of the single user and the rest of his defined subgroup. Together, the single user and the other members of his subgroup collaboratively select the target from the input choice options they started with.

Referring next to FIG. 18, the exemplary target area 1800 shows that the subgroup is about to select the input choice "Jaws" from the subset of movie suggestions presented to the subgroup under synchronous real-time control. This selection may be associated with a group cohesiveness score for the subgroup.

Upon selection of the target as the refined suggestion, the CCS 102 moderating the subgroup is ready to move this group to the next phase. In some embodiments, there may be a short delay while the CCS 102 waits for other parallel subgroups to complete their selection process as well. The CCS 102 need not wait for all subgroups to complete their selection process, but rather waits until enough subgroups have chosen answers that the answers can fill the target area 1600 of a single subgroup. In example above, with six slots on the target area 1800, the CCS 102 need only wait for five other subgroups to select the target before it moves those six subgroups to the next phase. Then, upon each subsequent six subgroups finishing, those subgroups are moved to the next (second) phase as well. Each group of six subgroups are then merged into a new larger subgroup by the CCS 102 software. (The number six is due to the six slots on the target area 1800 of this example).

Considering the single user mentioned above, his subgroup chose the target "Jaws". That selection remains on the target area 1800 displayed by his or her computing device by the CIA software. The other five slots on the target area 1800 are replaced by the selections made by the other five subgroups that have been merged with his original subgroup. The user need not be aware that other users have joined his subgroup, although an indication of the size of the subgroup can be displayed by the CIA software. In some instances the user may be curious to know how many others he or she is now working with as they've progressed to the next phase.

Referring next to FIG. 19, the exemplary target area 1900 during the selection period of the second phase is shown. Thus when in the second phase, the single user, plus the 11 other users from his original subgroup, plus the 12 users from each of the 5 other subgroups that have been merged with his subgroup, all see the same input choices 208 and are tasked with collaboratively selecting the target from the input choices 208. The input choice "Jaws" remains in the target area 1900, along with five input choices 208 targeted by other subgroups: "Raiders of the Lost Ark", Star Wars", "Shrek", "The Spy Who Loved Me", and "The French Connection".

This inventive method enables for a seamless, engaging, and fun experience for each individual user. From the perspective of a single user, once the target is selected from among the initial set of input choices 208 that were displayed on his computing device, that chosen target remains, but the other five choices that were on his screen are replaced by new choices (all of them being refined solutions that were chosen by other subgroups). The new task for this user is also easy to understand: to consider the set of refined choices that are now displayed and collaboratively guide the graphical pointer 210 towards a desired highly-refined-solution. This collaborative process is now performed with the larger subgroup that has been newly assigned and coordinated by the CCS 102 software. If the initial subgroup had 12 users as in the example above, the new subgroup has 72 users, for the subgroup is created by the CCS software merging the 6 subgroups that selected the six choices in the figure above (as described in FIG. 14). Thus what happens behind the scenes, without the single user needing to be concerned about, is that his subgroup has grown, now including the members of each of the subgroups that had selected the other 5 refined choices. And of course, this same process is performed in parallel with many other subgroups, merging together.

It's important to note that each of the new input choices 208 appearing on the single user's screen is associated with a subgroup of users who had chosen that input choice at the target, those subgroups now being added to the single user's new subgroup. Thus, the size of the group has grown by a factor of six. More importantly, it has grown in a very smart way, because each choice comes with a set of users who may have a bias to one input choice, but because this is true of all six of the refined choices, it balances out. In other words, groups are merged with the other groups that provided refined suggestions to their new decision process, thus canceling out any bias that each subgroup may bring to the newly formed larger subgroup.

Now the new larger subgroup needs to work together through synchronous real-time collaboration to control the pointer 210 and choose the target from among the newly displayed choices. It should be noted that all the other users in this subgroup had a similar experience to the single user. They all were part of the small subgroup that chose the refined solution from among the small set of initial solutions. In doing so, they all saw the other options in their initial set replaced by new options. They also had their subgroups combined with other subgroups associated with those options, thus forming a new and larger subgroup. It should also be noted that the exact same process is happening among many other subgroups of users in parallel, the number of those other groups of users depending upon the size of the total group.

The phase two subgroup (six times larger than his original sub group) is now considering the set of six refined input choices 208, the group working collaboratively to move the pointer 210 to one of the input choices 208, thereby collaboratively selecting it as the target. In this way, the synchronous group of users (subgroup) works together to choose the highly refined solution from among the set of six refined input choices 208. Upon selection, the single user will experience a repeat of the prior process, having the choices that were not selected replaced by a full set of highly refined solutions. Again, those highly refined solutions are associated with other subgroups of similar size that are merged with the group of the single user by the software processes disclosed herein. Thus, the single user's group has grown by a factor of six, yet again. And once again, the additional members include the subgroups that chose each of the five new highly refined solutions that appeared on the single user's screen.

This process repeats, each time the subgroup picking the solution from among the set of displayed solutions, those solutions that were not selected then being replaced by the solutions chosen by other subgroups, those subgroups then being merged into the full group. The number of times the process repeats depends on the number of users in the total group as well as the number of solutions that get displayed on the user's screen each time. In the current example, six input choices 208 get displayed each time, which is why the groups grow by a factor of 6 each time. Other embodiments could use a different number of solutions displayed at once. The important thing is that the number of solutions be small enough that each user can consider all of them, very quickly, and converge on a solution. In practice, some embodiments restrict this number to a set that is no smaller than 2 and no larger than 12.

As described previously, the CCS 102 software will repeatedly merge groups after each stage of the selection process, until only one group is formed, reaching a size that's substantially the full group. Under the methods described herein, the CCS 102 software will form this full sized group when the set of suggestions has been reduced to the single set of manageable size. Thus, the full group is tasked with considering the small set of top choices that have emerged from this massive parallel process.

Depending on the size of the initial group of users, many stages of refinement may have been coordinated by the CCS 102 software, with groups being strategically merged after each stage, but from any single user's perspective, all that's happened is that as he was presented with the small set of suggestions to choose from, worked with other users to choose one suggestion from among that small set, the unselected suggestions were then replaced with new suggestions, the group being tasked with selecting one suggestion from among the new set, this process then repeats a number of times until finally he is informed that the input choices 208 are now the final set and the single user is tasked with helping to select the final answer. The process is fun and fast and seamless, moderated by the CCS 102 that dynamically redefines the members of the subgroups associated with each set of choices to be chosen among in parallel.

Thus, the present invention enables the formation and moderation of large-scale collaborative groups and enables those groups to answer questions (or otherwise respond to prompts) as the single intelligent entity, the single intelligent entity able to field large numbers of suggestions from large numbers of participants in real-time and then evaluate and refine the large numbers of suggestions by using the massively-parallel, collaborative synchronous, real-time process, until the final collective will emerges from the group indicating the groups collaborative intent, all happening in a very short amount of time.

In fact, the present invention has been architected such that the final solution to the question or other prompt can emerge from a massive number of suggestions in a time that's far shorter than any single individual could have even read and considered all the suggestions. The result is a super-intelligence that exceeds the creative ability and decision-making ability of any single member of the group.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A collaborative decision-making system for enabling a plurality of networked users to converge upon group decisions through the real-time collaborative control of a graphical pointer, comprising:

a plurality of computing devices, each computing device associated with one of the plurality of networked users, each computing device including a display, a communication infrastructure, a processor, a memory, and a user interface configured to receive input from a user in real-time from the plurality of networked users;

a collaboration server in networked communication with the plurality of computing devices, the collaboration server including a processor, a memory, and a communication infrastructure, the collaboration server configured to run a collaboration mediation application; and a collaborative intent application configured to run simultaneously on each of the plurality of computing devices and configured to perform the following at substantially the same time as other of the plurality of computing devices:
  display a question and a set of spatially arranged graphical targets as input choices for the plurality of networked users, each of the graphical targets for optional association with an answer option regarding the displayed question;
  display a suggestion prompt to a user for accepting at least one suggested answer to the displayed question, the prompt enabling the user to optionally input an answer suggestion within a prescribed time period;
  send, to the collaboration server, a representation of the user-entered answer suggestion if input by the user within the prescribed time period;
  receive a plurality of user-entered answer suggestions from the collaboration server, a plurality of the suggestions originating from other of the plurality of computing devices;
  display each of the plurality of the received answer suggestions in association with one of the spatially arranged graphical targets;
  display a collaboratively controlled graphical pointer at a location relative to set of spatially arranged graphical targets, wherein the displayed collaboratively controlled graphical pointer reflects a collectively combined group input from the plurality of networked users, the graphical pointer location relative to the spatially arranged graphical targets being substantially similar to that displayed by other of the plurality of computing devices;
  receive, repeatedly in real-time, updated location information for the collaboratively controlled graphical pointer and update the displayed location relative to the set of spatially arranged graphical targets accordingly, the updated location being substantially similar to that displayed by other of the plurality of computing devices;
  accept, repeatedly in real-time, user intent input from the user indicating an intended direction of motion of the collaboratively controlled graphical pointer; and
  send, repeatedly in real-time, the user intent data to the collaboration server, the user intent data representing the user intent input regarding the user's intended direction of motion of the collaboratively controlled pointer at a moment in time; wherein the collaborative intent application running on the collaborative server is configured to:
  receive, repeatedly in real-time, the user intent data from the plurality of the computing devices, the user intent data representing desired motion of the collaboratively controlled graphical pointer;
  process, repeatedly in real-time, the user intent data to compute an updated location of the collaboratively controlled graphical pointer relative to the set of spatially arranged targets;
  send, repeatedly in real-time, the updated location information for the collaboratively controlled graphical pointer to the plurality of computing devices, thereby enabling collaborative control to determine a final collaborative suggestion;
  determine, based on the relative location of the collaboratively controlled graphical pointer and each of the spatially arranged graphical targets, that the answer suggestion associated the most with one of the spatially arranged graphical targets has been selected as the final collaborative suggestion through real-time collaborative control, and
  send an indication of the final collaborative suggestion to the plurality of computing devices.

2. The collaborative decision-making system of claim 1, wherein each user is associated with an identifier and the identifier of each user who input the answer suggestion is displayed with the answer suggestion.

3. The collaborative decision-making system of claim 1, wherein the prescribed time period is ended when either (a) a countdown timer elapses or (b) a maximum number of answer suggestions are received by the collaboration server.

4. The collaborative decision-making system of claim 1, wherein each computing device may send no more than one suggested answer to the collaboration server for the currently displayed question.

5. The collaborative decision-making system of claim 1, wherein each of the plurality of computing devices displays the final collaborative suggestion with an indication that it is the collaboratively selected answer to the question.

6. The collaborative decision-making system of claim 1, wherein the user who input the final collaborative suggestion is awarded points.

7. The collaborative decision-making system of claim 1, wherein the user who input the final collaborative suggestion is awarded credits redeemable for getting answers to future questions.

8. The collaborative decision-making system of claim 1, wherein the collaboration server is one of the plurality of computing devices.

9. The collaborative decision-making system of claim 1, wherein the determination that one answer suggestion is selected as the final collaborative suggestion is based upon the collaboratively controlled graphical pointer being within a threshold proximity of the associated graphical target for more than a threshold amount of time.

10. The collaborative decision-making system of claim 1, wherein the collaboration server executes a first processes and a second process, the first process being a suggestion process which executes during a suggestion period, and the second process being an answer selection process that executes during an answer period.

11. The collaborative decision-making system of claim 10, wherein the suggestion period ends at the first occurrence of (a) a certain number of suggestions have been received by the collaboration server, and (b) a prescribed time period has elapsed.

* * * * *

UNITED STATES PATENT AND TRADEMARK OFFICE
CERTIFICATE OF CORRECTION

PATENT NO. : 10,277,645 B2
APPLICATION NO. : 14/920819
DATED : April 30, 2019
INVENTOR(S) : Rosenberg Page 1 of 1

It is certified that error appears in the above-identified patent and that said Letters Patent is hereby corrected as shown below:

On the Title Page

Column 1, Line 4, Related U.S. Application Data, below "(Continued)", insert
--Foreign Application Priority Data
Oct. 20, 2015 (WO) PCT/US15/56394--, as a new entry.

In the Claims

Claim 1, Column 56, Line 12, delete "control," and insert --control;--.

Signed and Sealed this
Ninth Day of July, 2019

Andrei Iancu
*Director of the United States Patent and Trademark Office*